US012579364B1

(12) United States Patent
Martabit Sagredo et al.

(10) Patent No.: US 12,579,364 B1
(45) Date of Patent: Mar. 17, 2026

(54) MACHINE LEARNING TECHNIQUES FOR DETECTING, MEASURING, AND MITIGATING BIAS WITHIN TEXTUAL CONTENT

(71) Applicant: Theodora Lab AI LLC, Lewes, DE (US)

(72) Inventors: María José Martabit Sagredo, Santiago (CL); Ricardo Baeza Yates, Palo Alto, CA (US); Mary Isabel Buenaventura Keane, Santiago (CL); Sofia Arrigoni Quintela, Santiago (CL); Manuel Ignacio Cartagena Herrera, Santiago (CL); Vladimir Giovanny Araujo Vásquez, Quito (EC)

(73) Assignee: Theodora Lab AI LLC, Lewes, DE (US)

( * ) Notice: Subject to any disclaimer, the term of this patent is extended or adjusted under 35 U.S.C. 154(b) by 0 days.

(21) Appl. No.: 18/977,424

(22) Filed: Dec. 11, 2024

(51) Int. Cl.
*G06F 40/284* (2020.01)
*G06F 40/197* (2020.01)
(Continued)

(52) U.S. Cl.
CPC .......... *G06F 40/284* (2020.01); *G06F 40/197* (2020.01); *G06F 40/30* (2020.01);
(Continued)

(58) Field of Classification Search
None
See application file for complete search history.

(56) References Cited

U.S. PATENT DOCUMENTS 10,242,260 B1 * 3/2019 Shen ..................... G06F 40/205
10,885,279 B2 1/2021 Barachha et al.
(Continued)

OTHER PUBLICATIONS

Mayra Russo; Yasharajsinh Chudasama; Disha Purohit; Sammy Sawischa; Maria-Esther Vidal; Employing Hybrid AI Systems to Trace and Document Bias in ML Pipelines; Jul. 2024; URL: https://ieeexplore.ieee.org/document/10596297 (Year: 2024).*
(Continued)

*Primary Examiner* — Richa Sonifrank
(74) *Attorney, Agent, or Firm* — Cooper Legal Group LLC

(57) ABSTRACT

Various embodiments of the present disclosure provide bias resolution modeling techniques for automatically detecting biasing terms and generating and presenting candidate bias mitigation insights for potential replacement of such biasing terms. In an example embodiment, a bias resolution system receives a document comprising textual data, performs, using one or more machine learning models, a tokenization operation based at least in part on the textual data; identifies, using the one or more machine learning models, one or more biasing terms based at least in part on the tokenized textual data, generates, using the one or more machine learning models, one or more candidate bias mitigation insights, wherein (i) the one or more candidate bias mitigation insights correspond to the one or more biasing terms, and (ii) at least one of the one or more machine learning models is a pre-trained large language foundation model fine-tuned using a tokenized dataset with labeled biases (DLB) comprising a plurality of tokens that correspond to one or more bias classification labels, and outputs through an interactive user interface component, a presentation of at least the one or more candidate bias mitigation insights to a user. These insights and bias metrics may be dynamically surfaced or (Continued)

100 exposed to a user via improved user interfaces and user interface components.

20 Claims, 11 Drawing Sheets

(51) Int. Cl.

| | | |
|---|---|---|
| *G06F 40/279* | (2020.01) | |
| *G06F 40/30* | (2020.01) | |
| *G06N 3/08* | (2023.01) | |
| *G06N 20/00* | (2019.01) | |
| *G06F 16/28* | (2019.01) | |

(52) U.S. Cl.
CPC ............... *G06N 3/08* (2013.01); *G06N 20/00* (2019.01); *G06F 16/285* (2019.01); *G06F 40/279* (2020.01)

(56) References Cited

U.S. PATENT DOCUMENTS

| | | | |
|---|---|---|---|
| 11,270,080 | B2 | 3/2022 | Rao et al. |
| 11,657,236 | B2 | 5/2023 | McGovern et al. |
| 11,675,980 | B2 | 6/2023 | Sahayaraj et al. |
| 11,741,296 | B2 | 8/2023 | Madaan et al. |
| 12,032,919 | B1 * | 7/2024 | Szwabe ................. G06F 40/284 |
| 12,198,030 | B1 * | 1/2025 | Mysore ............... G06F 11/3692 |
| 2016/0350672 | A1 * | 12/2016 | Snyder .................... G06N 20/00 |
| 2019/0188605 | A1 * | 6/2019 | Zavesky ............... G06N 20/00 |
| 2021/0097239 | A1 | 4/2021 | Arora et al. |
| 2022/0147713 | A1 | 5/2022 | Garimella et al. |
| 2022/0172101 | A1 * | 6/2022 | Das ........................... G06N 5/04 |
| 2022/0335217 | A1 | 10/2022 | Panwar et al. |
| 2022/0392434 | A1 | 12/2022 | Abedelkader et al. |
| 2023/0089783 | A1 * | 3/2023 | Patel ................... G06F 16/2379 707/703 |
| 2023/0315994 | A1 | 10/2023 | Friedman et al. |
| 2023/0316003 | A1 * | 10/2023 | Friedman ............. G06N 3/0442 704/9 |
| 2024/0386707 | A1 * | 11/2024 | Ungureanu .......... G06V 10/761 |
| 2025/0053791 | A1 * | 2/2025 | Teo ......................... G16H 80/00 |
| 2025/0272511 | A1 * | 8/2025 | Benson .................. G06N 3/096 |
| 2025/0284886 | A1 * | 9/2025 | Wadhawan ........... G06F 40/253 |
| 2025/0335748 | A1 * | 10/2025 | Hackmann ........... G06N 3/0475 |

OTHER PUBLICATIONS

Diederik P Kingma et al.: "ADAM: A Method for Stochastic Optimization"; Published as a conference paper at ICLR 2015, Jan. 30, 2017, 15 pages.

Jieyu Zhao et al.: "Men Also Like Shopping: Reducing Gender Bias Amplification using Corpust-level Constraints", University of Washington, y89@cs.washington.edu; arXiv:1707.09457v1 [cs.AI], Jul. 29, 2017

Jha et al.: "When Does a Compliment Become Sexist? Analysis and Classification of Ambivalent Sexism Using Twitter Data", Kohli Center on Intelligent Systems (KCIS), International Institute Technology, Hyderbad (IIIT Hyderabad), Proceedings of the Second Workshop on Natural Language Processing and Computational Social Science, p. 7-16, Vancouver, Canada, Aug. 3, 2017 2017 Association for Computational Linguistics.

* cited by examiner

400

RECEIVE DATASET WITH LABELED BIASES (DLB) 402

PERFORM ONE OR MORE DATA PROCESSING TECHNIQUES 404

TRAIN MACHINE LEARNING MODEL(S) WITH TOKENIZED DLB 406

EVALUATE THE MACHINE LEARNING MODEL(S) 408

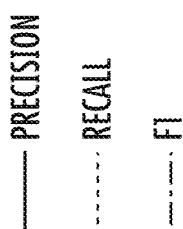
PRECISION
RECALL
F1
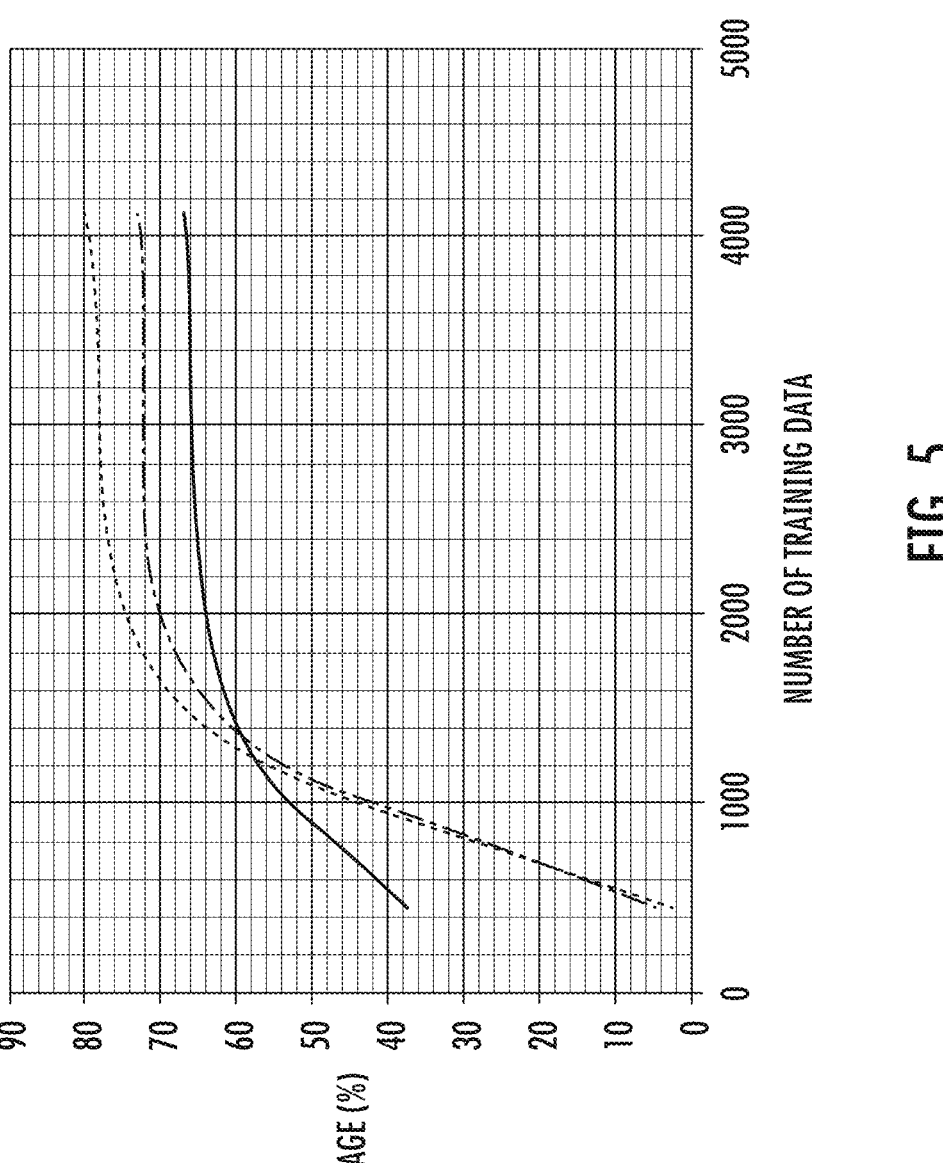
FIG. 5

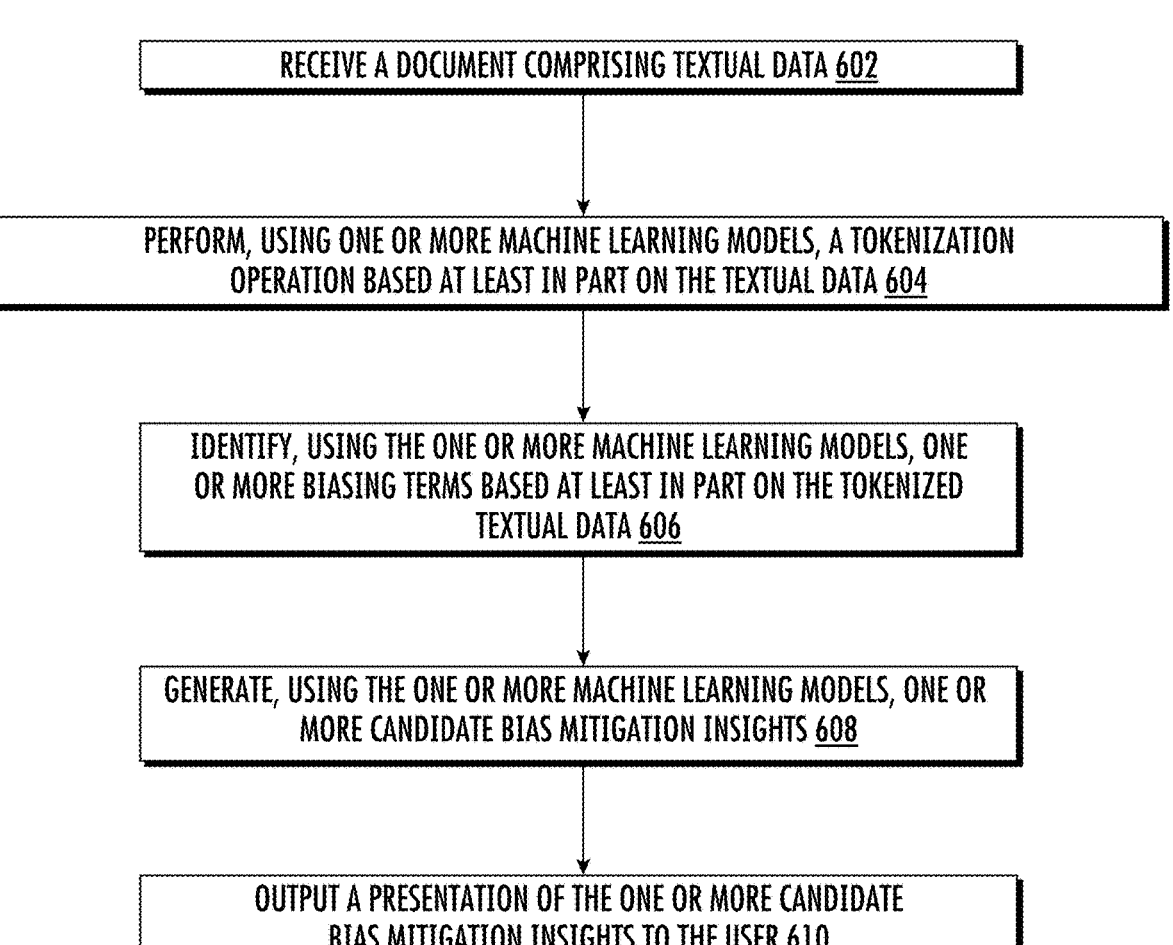

600

RECEIVE A DOCUMENT COMPRISING TEXTUAL DATA 602

PERFORM, USING ONE OR MORE MACHINE LEARNING MODELS, A TOKENIZATION OPERATION BASED AT LEAST IN PART ON THE TEXTUAL DATA 604

IDENTIFY, USING THE ONE OR MORE MACHINE LEARNING MODELS, ONE OR MORE BIASING TERMS BASED AT LEAST IN PART ON THE TOKENIZED TEXTUAL DATA 606

GENERATE, USING THE ONE OR MORE MACHINE LEARNING MODELS, ONE OR MORE CANDIDATE BIAS MITIGATION INSIGHTS 608

OUTPUT A PRESENTATION OF THE ONE OR MORE CANDIDATE BIAS MITIGATION INSIGHTS TO THE USER 610

FIG. 6

MACHINE LEARNING TECHNIQUES FOR DETECTING, MEASURING, AND MITIGATING BIAS WITHIN TEXTUAL CONTENT

BACKGROUND

Bias and discrimination refer to expressions with an inclination or prejudice in favor or against a person or group that may contain an offensive, hurtful, and/or exclusive meaning. Discrimination can manifest itself in a variety of different forms, such as gender bias, age, ethnicity, disabilities, sexual orientation, personal characteristics, and socioeconomic status, among other kinds of biases present in written media. Applicant has identified a number of deficiencies and problems associated with automatically and reliably identifying and correcting textual bias and other discriminations in both internal and external documents of public and private organizations. Through applied effort, ingenuity, and innovation, many of these identified deficiencies and problems associated with traditional bias techniques have been solved by developing solutions in accordance with the embodiments of the present disclosure, example solutions are described in detail herein.

BRIEF SUMMARY

The present disclosure contemplates methods, apparatuses, computer program products, and systems that leverage a machine learning model framework, such as a bias detection model and/or a bias mitigation model, for automatically detecting, measuring, and/or mitigating bias in one or more textual input data structures. Various embodiments are directed to automated bias detection and bias mitigation modeling techniques that empower an interactive graphical user interface (GUI) to dynamically surface or expose such identified biasing terms, candidate bias mitigation insights, bias metrics, and other relevant data for a plurality of bias categories.

In some embodiments, a bias resolution system comprises memory and one or more processors communicatively coupled to the memory, the one or more processors configured to receive a document comprising textual data; perform, using one or more machine learning models, a tokenization operation based at least in part on the textual data; identify, using the one or more machine learning models, one or more biasing terms based at least in part on the tokenized textual data; generate, using the one or more machine learning models, one or more candidate bias mitigation insights, wherein (i) the one or more candidate bias mitigation insights correspond to the one or more biasing terms, and (ii) at least one of the one or more machine learning models is a pre-trained large language foundation model fine-tuned using a tokenized dataset with labeled biases (DLB) comprising a plurality of tokens that correspond to one or more bias classification labels; and output, through an interactive user interface component, a presentation of at least the one or more candidate bias mitigation insights to a user.

In some embodiments, the one or more processors are further configured to receive, through the interactive user interface component, user input indicative of a selection of at least one of the one or more candidate bias mitigation insights; and generate an updated version of the document, the updated version of the document comprising the selected candidate bias mitigation insight in place of the corresponding one or more biasing terms.

In some embodiments, identifying the one or more biasing terms comprises inputting the tokenized textual data into a machine learning bias detector model; detecting the one or more biasing terms in the tokenized textual data; and generating a bias classification label and a bias position identification for each of the one or more biasing terms.

In some embodiments, generating the one or more candidate bias mitigation insights comprises inputting the one or more biasing terms and the corresponding bias classification labels and bias position identifications to a machine learning bias mitigation model to generate the one or more candidate bias mitigation insights.

In some embodiments, the one or more candidate bias mitigation insights comprises a proposed replacement text string or textual instructions to rephrase the corresponding biasing terms.

In some embodiments, a portion of each bias classification label identifies the corresponding token as a beginning token of a bias classification or as an identified token of the bias classification.

In some embodiments, the tokenized DLB is generated from at least a DLB comprising a plurality of text samples, each text sample including a position of at least one identified biased text, bias classification information of the at least one identified biased text, and at least one bias mitigation text corresponding to the at least one identified biased text. In some further embodiments, the plurality of bias classifications includes at least one of age, gender, race/ethnicity/nationality, sexual orientation, religion, socioeconomic, disability, personal characteristics, or violent classification.

In some embodiments, the one or more processors are further configured to receive the DLB, perform one or more data processing techniques to the DLB to form the tokenized DLB, and train the one or more machine learning models with the tokenized DLB. In some further embodiments, the one or more data processing techniques comprise at least one of a transformation process, an extraction process, or a tokenization operation.

In some embodiments, the DLB is generated using a bias criterion, the bias criterion defining a plurality of bias classifications and for each bias classification, a corresponding description for identifying a biased text as encompassed by the respective bias classification.

In another example embodiment of the present disclosure, a computer-implemented method comprises receiving a document comprising textual data; performing, using one or more machine learning models, a tokenization operation based at least in part on the textual data; identifying, using the one or more machine learning models, one or more biasing terms based at least in part on the tokenized textual data; generating, using the one or more machine learning models, one or more candidate bias mitigation insights, wherein (i) the one or more candidate bias mitigation insights correspond to the one or more biasing terms, and (ii) at least one of the one or more machine learning models is a pre-trained large language foundation model fine-tuned using a tokenized DLB comprising a plurality of tokens that correspond to one or more bias classification labels; and outputting, through an interactive user interface component, a presentation of at least the one or more candidate bias mitigation insights to a user.

In some embodiments, the computer-implemented method further comprises receiving, through the interactive user interface component, user input indicative of a selection of at least one of the one or more candidate bias mitigation insights; and generating an updated version of the document, the updated version of the document comprising the selected candidate bias mitigation insight in place of the corresponding one or more biasing terms.

In some embodiments, identifying the one or more biasing terms comprises inputting the tokenized textual data into a machine learning bias detector model; detecting the one or more biasing terms in the tokenized textual data; and generating a bias classification label and a bias position identification for each of the one or more biasing terms.

In some embodiments, generating the one or more candidate bias mitigation insights comprises inputting the one or more biasing terms and the corresponding bias classification labels and bias position identifications to a machine learning bias mitigation model to generate the one or more candidate bias mitigation insights.

In some embodiments, the one or more candidate bias mitigation insights comprises a proposed replacement text string or textual instructions to rephrase the corresponding biasing terms.

In some embodiments, a portion of each bias classification label identifies the corresponding token as a beginning token of a bias classification or as an identified token of the bias classification.

In another example embodiment of the present disclosure, a non-transitory computer-readable storage medium for identifying and mitigating bias in written communications, the non-transitory computer-readable storage medium including instructions that when executed by a computer, cause the computer to receive a document comprising textual data; perform, using one or more machine learning models, a tokenization operation based at least in part on the textual data; identify, using one or more machine learning models, one or more biasing terms based at least in part on the tokenized textual data; generate, using the one or more machine learning models, one or more candidate bias mitigation insights, wherein (i) the one or more candidate bias mitigation insights correspond to the one or more biasing terms, and (ii) at least one of the one or more machine learning models is a pre-trained large language foundation model fine-tuned using a tokenized DLB comprising a plurality of tokens that correspond to one or more bias classification labels; and output, through an interactive user interface component, a presentation of at least the one or more candidate bias mitigation insights to a user.

In some embodiments, identifying the one or more biasing terms comprises inputting the tokenized textual data into a machine learning bias detector model; detecting the one or more biasing terms in the tokenized textual data; and generating a bias classification label and a bias position identification for each of the one or more biasing terms.

In some embodiments, generating the one or more candidate bias mitigation insights comprises inputting the one or more biasing terms and the corresponding bias classification labels and bias position identifications to a machine learning bias mitigation model to generate the one or more candidate bias mitigation insights.

In some embodiments, a portion of each bias classification label identifies the corresponding token as a beginning token of a bias classification or as an identified token of the bias classification.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
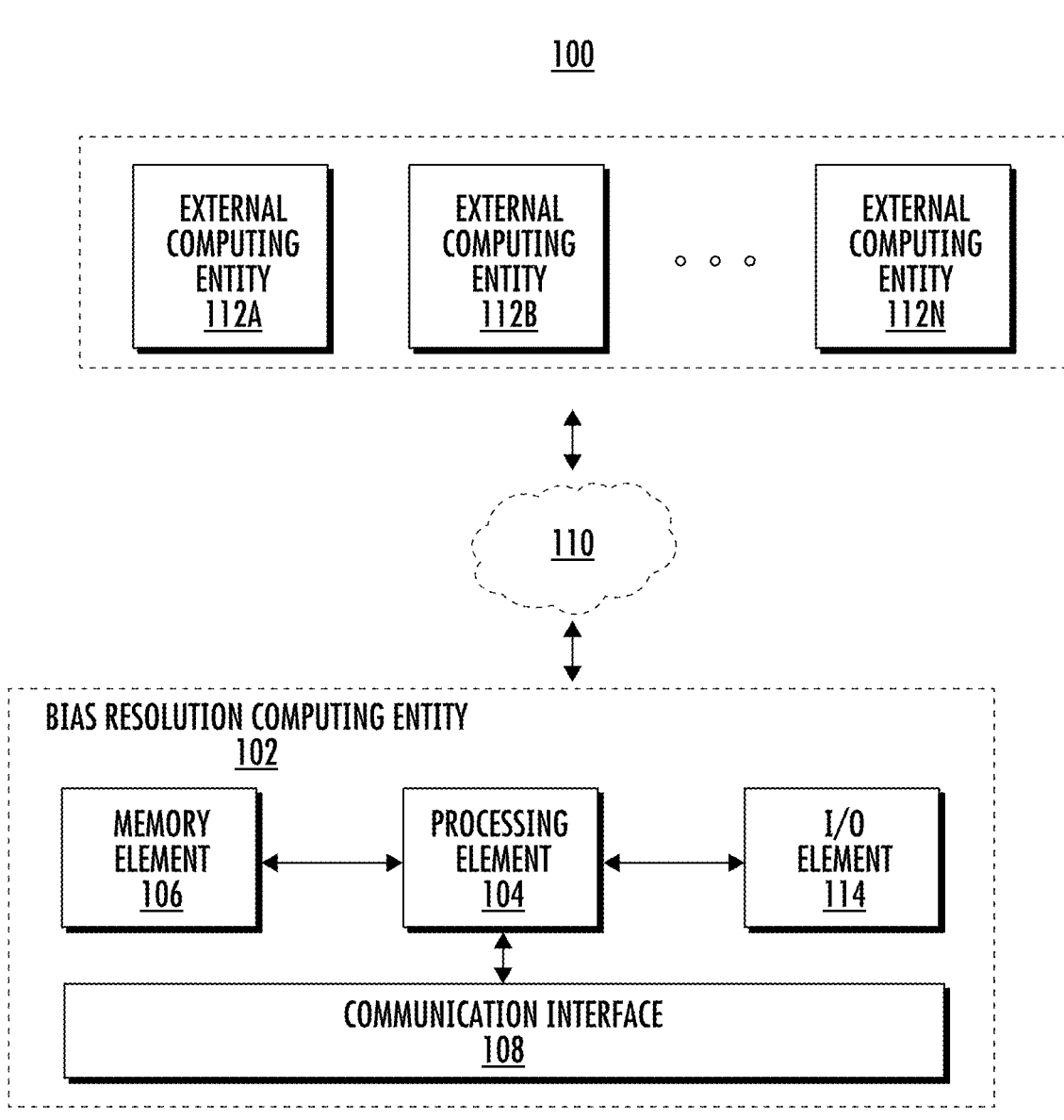

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings:

FIG. 1 illustrates an example computing system in accordance with various example embodiments of the present disclosure.

Figure 2:
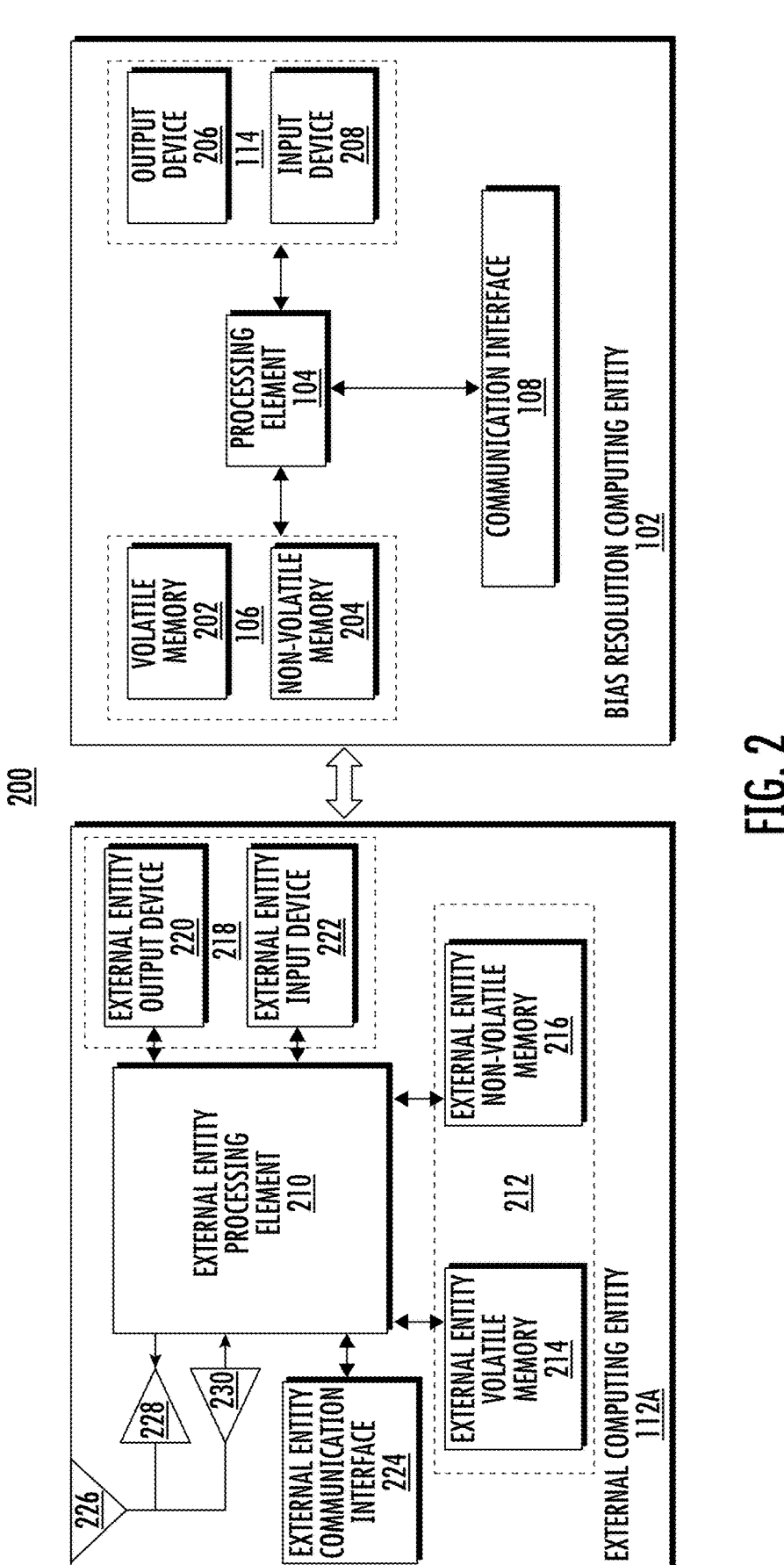

FIG. 2 is a schematic diagram showing a system computing architecture in accordance with various embodiments of the present disclosure.

Figure 3:
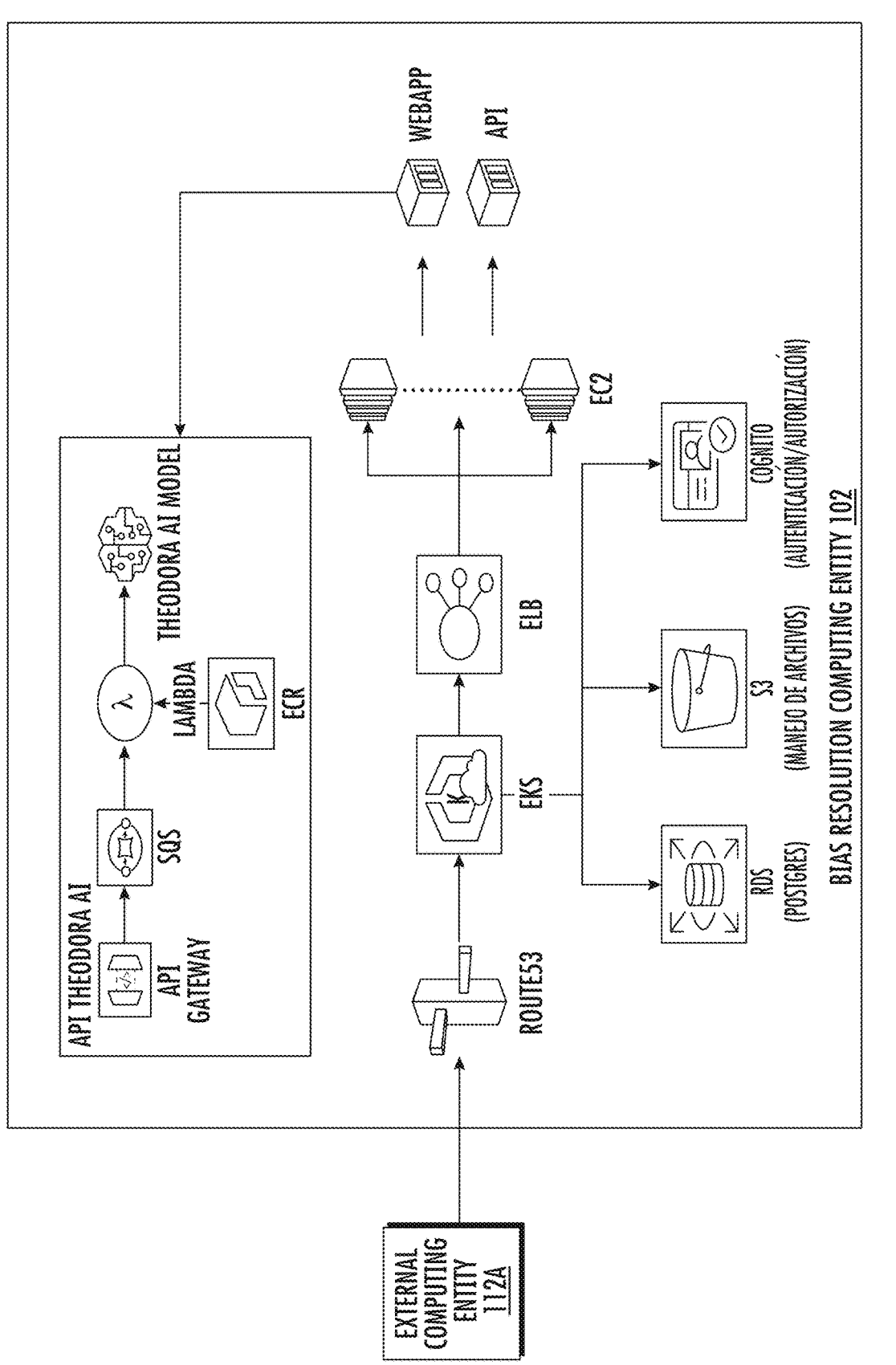

FIG. 3 is a schematic diagram of an example bias resolution computing entity in accordance with various embodiments of the present disclosure.

Figure 4:
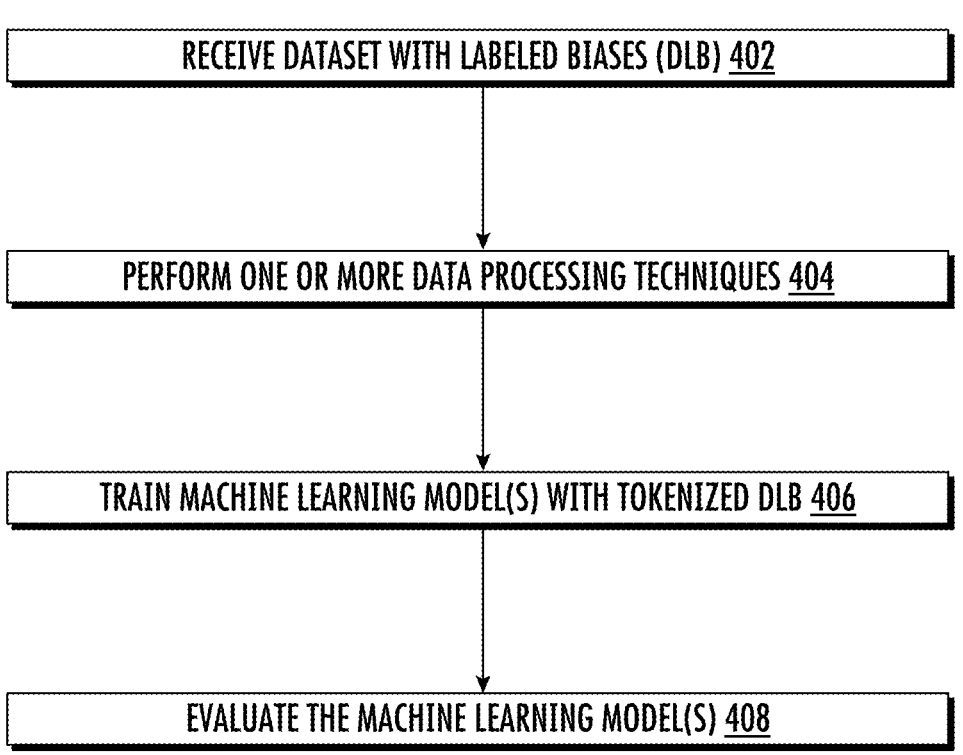

FIG. 4 is a flowchart showing an example process for training one or more machine learning models in accordance with various embodiments of the present disclosure.

FIG. 5 illustrates the evolution of performance of an example gender bias detection model as more data is incorporated into the training data set of an example gender bias detection model in accordance with various embodiments of the present disclosure.

FIG. 6 is a flowchart showing an example of a process for generating and outputting one or more candidate bias mitigation insights to a user in accordance with various embodiments of the present disclosure.

FIGS. 7A-7D illustrate example interactive user interface and user interface components in accordance with various embodiments of the present disclosure.

Figure 8:
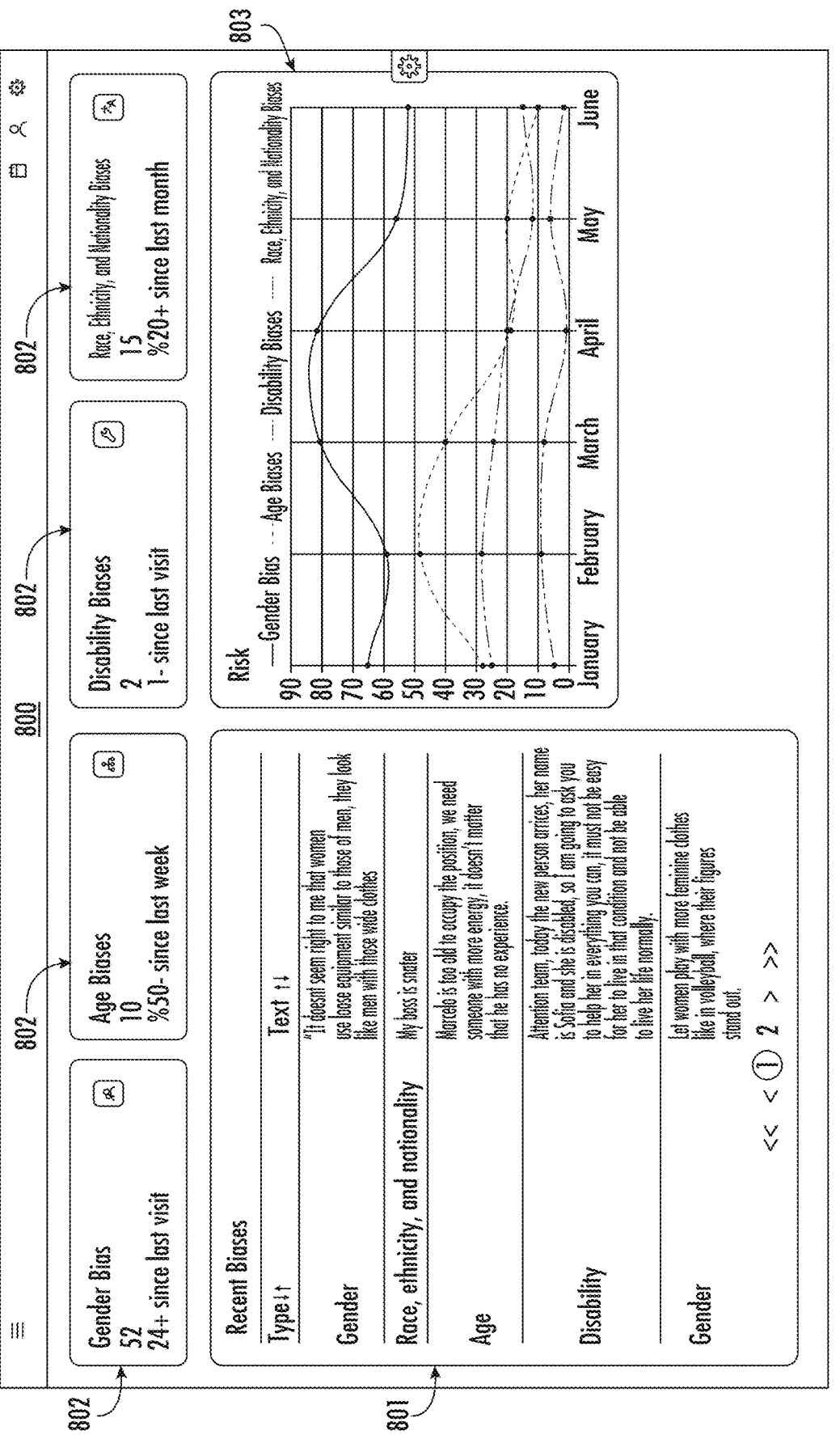

FIG. 8 illustrates an example interactive user interface in accordance with various embodiments of the present disclosure.

DETAILED DESCRIPTION

One or more embodiments now will be more fully described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard). It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements. Moreover, while certain embodiments of the present disclosure are described with reference to predictive or insight data analysis, one of ordinary skills in the art will recognize that the disclosed concepts may be used to perform other types of data analysis.

I. OVERVIEW

Embodiments of the present disclosure are directed to devices and methods encompassing machine learning models that enable computer detection, interpretation, and mitigation of bias within natural language text. The present disclosure provides a machine learning model pipeline that leverages deep learning from a training data set that is applied to natural language processing and social linguistics to identify biasing terms and phrases and generates candidate bias mitigation insights (e.g., identifying the textual content that reflects a bias, identifying the type of bias, and proposing changes to the text to mitigate the bias). The machine learning model pipeline, for example, may include a bias detection model and a bias mitigation model. The bias detection model may be a trained machine learning model trained using a training data set and that is fine-tuned using a specialized DLB that is for consumption by the bias detection model. For example, the DLB may include a plurality of text samples (which may be provided in written form or may be transcribed (voice-to-text conversion) from an audio sample before processing) with corresponding bias identifications (e.g., a bias corpus including a collection of predefined biasing terms aggregated from a plurality of data sources), positioning of the identified bias in each text sample, and bias classifications (e.g., from a bias manual containing taxonomy and characterization of different kinds of biases and providing guidelines for identifying and classifying such biases). In some embodiments, the DLB may be language-specific. In a non-limiting example, the DLB may be developed based on Spanish-language texts, which may include or exclude biases different from English-language texts since the gender of a noun is an essential part of the Spanish language. In some embodiments, the DLB may include any number of language-based texts. This DLB may, in turn, be configured to facilitate extraction of relevant bias information and apply transformations to prepare the data for consumption as a specialized DLB by the bias detection model (e.g., a large language model). That is, the transformation process may be configured to reduce a biased text sample to structured metadata that is representative of the dense bias information from the DLB. For example, with respect to an example text sample, the identified bias terms, the bias classification label of each word, and the positioning may be extracted from the original DLB. In turn, a tokenization operation may be applied (e.g., a pre-trained tokenizer) to split the identified bias terms into tokens (e.g., smaller units), resulting in a list or array of tokens and their respective bias classification labels. That is, tokens that have no bias may be labeled "O" and tokens that are part of an identified bias may be labeled with "B.B.Gender", for example, if they mark the beginning of a gender bias or "I.B.Gender", for example, if they are not the starting token, but are still part of the identified bias. A subset of the specialized DLB (e.g., 80% data points) may serve as a training set to train the bias detection model and another subset (e.g., 20% of the data points) may serve as an evaluation or validation set to determine if the bias detection model is correctly detecting biases according to the classification labels of the original dataset. For example, the training subset of the specialized DLB (e.g., tokenized biases subset) is provided to the bias detection model to train the bias detection model and the evaluation or validation subset is then provided to the bias detection model to validate the training of the bias detection model. In turn, the bias mitigation model may be trained, using labeled bias terms and/or proposed alternative text for eliminating or otherwise correcting bias, to generate predictive candidate bias mitigation insights and proposals for avoiding bias for identified bias terms. When combined with the bias detection model, the bias mitigation model forms an improved machine learning model pipeline that is capable of automatically generating bias mitigation insights (e.g., alternative test predictions that suitably eliminate the identified bias) for the identified bias terms. This, in turn, allows for comprehensive, on-demand, prediction techniques that may automatically generate, monitor, and present bias metrics and insights for an organization, for example, captured over time.

Embodiments of the present disclosure present continually improved machine learning models by leveraging learning algorithms and user feedback to further fine tune the learning algorithms. For example, user feedback is collected with respect to various bias decisions of the bias resolution system by providing improved user interfaces for users to accept and/or override the bias mitigation insights. This, in turn, enables the bias resolution system to continue to learn from the applied confirmations and/or changes associated with the user feedback.

Embodiments of the present disclosure present improved user interfaces and user interface components for dynamically surfacing or exposing identified biasing terms, candidate bias mitigation insights, bias metrics, and other relevant data for a plurality of bias categories to a user. The user interfaces may be leveraged by computing devices in communication with the bias resolution system, enabling a user to analyze, identify, record, and mitigate different classes of bias, in real time, in a variety of different types of documents. The user interface leverages the outputs of a machine learning model pipeline (e.g., identified biasing terms, candidate bias mitigation insights, bias metrics, and other relevant data) to present easily interpretable data for consumption by the user. For example, identified biasing terms, bias classifications, and candidate bias mitigation insights may be derived from predictions for the analyzed text and may present previously undetectable metrics, statistics, and insights to the user. The user interfaces and user interface components may enable graphical depictions of such metrics, statistics, and insights to visualize changes over time and across a variety of different bias classifications. The improved user interfaces and user interface components for electronic devices may be practically applied for any number of different use cases to surface or expose such identified biasing terms, candidate bias mitigation insights, bias metrics, and accurate visualizations to improve a user's accessibility to such bias metrics and indicators over traditional interfaces. Ultimately, the automated systems of the present disclosure leverage new user interface designs and sequences to enable real-time access to at least biasing terms, bias classifications, candidate bias mitigation insights, and other bias metrics, allowing users and organizations to take decisions to reduce reputational risk (e.g., diversity and inclusion), for example, which is unattainable by traditional computing systems.

The bias resolution system is an artificial intelligence-based solution encompassing a platform that detects, identifies, classifies, records, mitigates, and/or corrects discriminatory biases in various types of documents or textual inputs, to avoid content that perpetuates stereotypes questions in this century. Examples of technologically advantageous embodiments of the present disclosure include: (i) a machine learning model pipeline for identifying, classifying, and mitigating bias within text; (ii) a feedback scheme for automatic, continuous, training of the machine learning pipeline for improved predictions; and (iii) comprehensive user interfaces, among other aspects of the present disclosure. Other technical improvements and advantages may be realized by one of ordinary skill in the art.

Example Terminology

Although the present disclosure describes various embodiments using one or more fine-tuned large language foundation model(s), the techniques of the present disclosure are applicable to any type of machine learning model, algorithm, and/or the like. The inputs, outputs, categorizations, and/or labels may be based at least in part on the type, purpose, and/or architecture of the particular machine learning model. The term "machine learning model," "model," and/or the like may refer to a machine learning or deep learning task or mechanism. Machine learning is a method used to devise complex models and algorithms that lend themselves to prediction. A machine learning model is a computer-implemented algorithm that may learn from data with or without relying on rules-based programming. These models enable reliable, repeatable decisions and results and uncovering of hidden insights through machine-based learning from historical relationships and trends in the data. For example, a machine learning model may be configured, trained (e.g., jointly, separately, etc.), and/or the like to perform an identification, classification, prediction, recommendation, and/or any other computing task, such as a data entity that describes parameters, hyper-parameters, and/or defined operations of a rules-based and/or machine learning model (e.g., model including at least one of one or more rule-based layers, one or more layers that depend on trained parameters, coefficients, and/or the like).

A machine learning model may be initially fit or trained on a training dataset (e.g., a set of examples used to fit the parameters of the model). The machine learning model(s) may include one or more of any type of machine learning models including one or more supervised, unsupervised, semi-supervised, reinforcement learning models, and/or the like. For example, the model may be trained on the training dataset using supervised or unsupervised learning. The model is run with the training dataset and produces a result, which is then compared with a target, for input vectors in the training dataset. Based on the result of the comparison and the specific learning algorithm being used, the parameters of the model are adjusted. The model fitting may include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g., the number of hidden units in a neural network). The validation dataset includes input data that resembles typical input for the model (e.g., formatted in the same way and including the same types of data), but also includes model output data so that the output of the model based on the input may be compared against the model output data of the validation data set to ensure the model is producing proper output. In some embodiments, a machine learning model can be trained in real-time (e.g., online training) while in use. Moreover, a machine learning model may be refined over time, as new text is added to the training data set.

Machine learning models, as described above, may make use of multiple ML engines, e.g., for analysis, recommendation generating, transformation, and other needs. For example, in some embodiments, the machine learning model(s) may include multiple models configured to perform one or more different stages of an identification, classification, prediction, recommendation, and/or the like computing task.

The system may train different machine learning models for different needs and different ML-based engines. The system may generate new models (e.g., based on the gathered training data) and may evaluate their performance against the existing models. Training data may include any of the gathered information, as well as information on actions performed based on the various recommendations.

Machine learning models may be any suitable model for the task or activity implemented by an ML-based engine. In some embodiments, a machine learning model is a clustering model, a regression model, a neural network, a random forest, a decision tree model, a classification model, or the like. Machine learning models are known in the art and are typically some form of neural network. The term refers to the ability of systems to recognize patterns on the basis of existing algorithms and data sets to provide solution concepts. The larger the training data set, the greater knowledge they develop.

The underlying machine learning models may be learning models (supervised or unsupervised). As examples, such algorithms may be prediction (e.g., linear regression) algorithms, classification (e.g., decision trees, k-nearest neighbors) algorithms, time-series forecasting (e.g., regression-based) algorithms, association algorithms, clustering algorithms (e.g., K-means clustering, Gaussian mixture models, DBscan), or Bayesian methods (e.g., Naïve Bayes, Bayesian model averaging, Bayesian adaptive trials), image to image models (e.g., FCN, PSPNet, U-Net) sequence to sequence models (e.g., RNNs, LSTMs, BERT, Autoencoders, transformer-based), models combining planning with other models (e.g., PDDL-based), or Generative models (e.g., GANs, diffusion-based models).

Additionally or alternatively, machine learning models may implement statistical algorithms, such as dimensionality reduction, hypothesis testing, one-way analysis of variance (ANOVA) testing, principal component analysis, conjoint analysis, neural networks, support vector machines, decision trees (including random forest methods), ensemble methods, and other techniques. Other machine learning models may be generative models (such as Generative Adversarial Networks, diffusion-based or auto-encoders) to generate definitions and elements.

In various embodiments, machine learning models of the present disclosure may undergo a training or learning phase before they are released into a production or runtime phase or may begin operation with models from existing systems or models. During a training or learning phase, the machine learning models may be tuned (e.g., fine-tuned) to focus on specific variables, to reduce error margins, or to otherwise optimize their performance.

In various embodiments and when appropriate for the particular task, one or more of the machine learning models of the present disclosure may be implemented with rule-based systems, such as an expert system or a hybrid intelligent system that incorporates multiple AI techniques. A rule-based system is used to store and manipulate knowledge to interpret information in a useful way. It is often used in artificial intelligence applications and research. Rule-based systems constructed using automatic rule inference, such as rule-based machine learning, may be included in this system type. An example rule-based system is a domain-specific expert system that uses rules to make deductions or choices. For example, an expert system might help a doctor choose the correct diagnosis based on a cluster of symptoms or help a video game player to select tactical moves to play a game. Rule-based systems can be used to perform lexical analysis to compile or interpret computer programs, or in natural language processing. Rule-based programming attempts to derive execution instructions from a starting set of data and rules.

A hybrid intelligent system employs, in parallel, a combination of methods and techniques from artificial intelligence subfields, such as: Neuro-symbolic systems; Neuro-fuzzy systems; Hybrid connectionist-symbolic models; Fuzzy expert systems; Connectionist expert systems; Evolutionary neural networks; Genetic fuzzy systems; Rough fuzzy hybridization; and/or Reinforcement learning with fuzzy, neural, or evolutionary methods as well as symbolic reasoning methods. An example hybrid is a hierarchical control system in which the lowest, reactive layers are sub-symbolic. The higher layers, having relaxed time constraints, are capable of reasoning from an abstract world model and performing planning. Intelligent systems usually rely on hybrid reasoning processes, which include induction, deduction, abduction, and reasoning by analogy.

In some embodiments, the term "biasing term" may refer to a data entity that is associated with and/or descriptive of a particular bias group, class, category, and/or the like. A biasing term, for example, may be indicative of (e.g., include an indication of) a preference for or prejudice of a particular group, class, category, and/or the like over another. A biasing term, for example, may include a phrase, a word, and/or the like.

The terms "machine learning bias detection model" or "bias detection model" may refer to a data entity that describes parameters, hyper-parameters, and/or defined operations of a rules-based algorithm and/or machine learning model (e.g., model including at least one or more rule-based layers, one or more layers that depend on trained parameters, coefficients, and/or the like), and/or the like. In some examples, the bias detection model may be configured, trained, and/or the like to process textual data to identify one or more biasing terms present in the textual data. The bias detection model may be configured, trained, and/or the like to perform a tokenization operation, a biasing term identification operation, a bias classification tagging operation, and/or a bias positioning tagging operation as described herein. The bias detection model may include one or more of any type of machine learning model including one or more supervised, unsupervised, semi-supervised, reinforcement learning models, and/or the like. In a non-limiting example, the bias detection model may be previously trained. In another example, the bias detection model may be trained and/or fine-tuned using one or more supervised machine learning techniques. In some embodiments, the bias detection model is a large language foundation model fine-tuned with a specialized tokenized DLB that is generated based on a bias criterion as described herein. Alternatively, in another example, the bias detection model may be a rules-based model configured to apply a set of one or more rules (e.g., bias criterion) to identify biasing terms, classify biasing terms and/or tokens, and/or the like.

In some examples, the bias detection model may include multiple models configured to perform different stages of the bias detection. For example, the bias detection model may include one or more models configured, trained, and/or the like to identify biasing terms, include one or more other models configured, trained, and/or the like to classify the identified biasing terms, and/or include one or more other models configured, trained, and/or the like to identify positioning of an identified biasing term.

In some embodiments, the term "bias criterion" may refer to a data entity that describes one or more rules for identifying and/or classifying textual data. For example, in some embodiments, a bias criterion may define a plurality of bias classifications and for each bias classification, a corresponding description for identifying a biased text as encompassed by the respective bias classification. In a non-limiting example, a bias criterion may be used to develop a DLB which includes a plurality of text samples with corresponding bias identifications (e.g., a bias corpus including a collection of predefined biasing terms aggregated from a plurality of data sources), positioning of the identified bias in each text sample, and bias classifications that are selected based on a bias manual containing taxonomy and characterization of different kinds of biases and providing guidelines for identifying and classifying such biases. In other embodiments, the bias criterion may be entered manually (e.g., using user input) as structured data or unstructured data. When entered as unstructured data, the machine learning model is trained to recognize logic and instructions within the unstructured data to apply the bias criterion so that later identification of bias is performed consistently with the instructions embodied within the unstructured data. In some embodiments, the DLB may also include one or more candidate bias corrections for training one or more models, the candidate bias corrections corresponding to ways to correct the identified bias in each text sample to eliminate the bias.

In some embodiments, "tokenization operation" may refer to a data entity that describes one or more actions configured to segment text data into one or more tokens (e.g., smaller units). The one or more tokens, for example, may include a phrase, a word, and/or the like. In some examples, a tokenizer model may be utilized to segment textual data into one or more tokens. In some examples, the tokenizer model may include a bidirectional encoder representation from transformers (BERT) tokenizer (or BETO, which is a Spanish version of BERT). By way of example, output of a tokenization operation performed on example textual data "Promoting diversity and inclusion" may include "Promoting" word token, "diversity" word token, "and" word token, and/or "inclusion" word token.

In some embodiments, the term "biasing term identification operation" may refer to a data entity that describes one or more actions configured to detect and/or identify one or more biasing terms in textual data (e.g., tokenized textual data). For example, a biasing term identification operation may include predicting one or more words or phrases as a biasing term based on analysis of tokenized textual data and identifying and/or assigning the word(s) or phrase(s) as a biasing term.

In some embodiments, the term "bias classification tagging operation" may refer to a data entity that describes one or more actions configured to determine the bias classification (e.g., age, gender, race/ethnicity/nationality, sexual orientation, religion, socioeconomic, disability, personal characteristics, violent, and/or the like) and/or sub-classification (e.g., age stereotype, negative age limitation, masculine generalization, masculine pronouns as generics, gender asymmetry, profession in masculine, minorities, skin color stereotype, stereotype of physical traits, racial stereotype, outdated/insulting term when referring to sexual orientation, pejorative expression when referring to sexual orientation, suffix-ism when referring to sexual orientation, and/or the liked) associated with a biasing term and/or word token. For example, a bias classification tagging operation may include predicting the bias classification for a biasing term or word token and assigning the bias classification to the biasing term or word token. In some embodiments, a biasing term and/or word token may not be associated with or predicted to be associated with any bias classification. Such biasing term and/or word token may be tagged with "O" or some indication of lack of predicted bias classification.

In some embodiments, the bias classification tagging operation may also include an additional labeling of an individual word token which identifies a location of the individual word token in the identified biasing term. For example, in addition to predicting the bias classification for each word token in an example biasing term as a gender bias, the bias classification tagging operation may also include identifying whether the word token is a "beginning token" that marks the beginning of the identified bias or as an "identified token" that marks the word token as not the beginning token but still part of the identified bias. By way of non-limiting example, output (e.g., bias classification label) of a bias classification tagging operation performed on the Spanish input text "Los trabajadores de clase media son los que sostienen al país sobre sus hombros" (e.g., which translates to "The workers are the ones who hold the country on their shoulders" in English) may include, inter alia, "Los trabajadores" as "B-B.Gender", which identifies "Los tra-bajadores" as a gender bias (e.g., a generalization of a group of people using the masculine gender in Spanish) and a beginning token.

In some embodiments, the term "bias positioning tagging operation" may refer to a data entity that describes one or more actions configured to determine the position of a biasing term and/or word token in textual data. For example, a bias positioning tagging operation may include predicting the position for a biasing term or word token and assigning the bias position identification to the biasing term or word token. By way of non-limiting example, output (e.g., bias position identification) of a bias positioning tagging operation performed on the Spanish input text "Los trabajadores de clase media son los que sostienen al país sobre sus hombros" (e.g., which translates to "The workers are the ones who hold the country on their shoulders" in English) may include, inter alia, predicting and/or identifying "Los trabajadores" as occurring at characters 0 to 16 of the textual data (e.g., [0,16]).

In some embodiments, the term "machine learning bias mitigation model" or "bias mitigation model" may refer to a data entity that describes parameters, hyper-parameters, and/or defined operations of a rules-based algorithm and/or machine learning model (e.g., model including at least one or more rule-based layers, one or more layers that depend on trained parameters, coefficients, and/or the like), and/or the like. In some examples, the bias mitigation model may be configured, trained, and/or the like to determine one or more candidate bias mitigation insights (e.g., non-biasing terms) to replace identified biasing terms. For example, the bias mitigation model may be configured, trained, and/or the like to perform a candidate bias mitigation insight operation and/or a de-biasing operation as described herein. In some embodiments, the bias mitigation model is a large language foundation model fine-tuned with a specialized tokenized DLB. For example, in some embodiments, the DLB may also include one or more candidate bias corrections for training one or more models (e.g., the bias mitigation model), the candidate bias corrections corresponding to possible ways to correct the identified bias in each text sample to eliminate the bias.

In some examples, the bias mitigation model may include multiple models configured to perform one or more different stages of the bias mitigation. For example, the bias mitigation model may include one or more models configured, trained, and/or the like to predict and/or generate one or more candidate bias mitigation insights and/or include one or more other models configured, trained, and/or the like to replace an identified biasing term with a corresponding candidate bias mitigation insight.

In some embodiments, the term "candidate bias mitigation insight operation" may refer to a data entity that describes one or more actions configured to detect and/or identify one or more candidate bias mitigation insights for potentially replacing identified biasing terms in textual data. For example, a candidate bias mitigation insight operation may include predicting one or more words or phrases as a candidate bias mitigation insight based on analysis of output from a bias detection model (e.g., biasing term(s), bias classification label, bias position identification, and/or the like) and identifying and/or assigning the word(s) or phrase(s) as a candidate bias mitigation insight. By way of non-limiting example, output (e.g., candidate bias mitigation insight) of a candidate bias mitigation insight operation performed on the Spanish input text "Los trabajadores de clase media son los que sostienen al país sobre sus hombros" (e.g., which translates to "The workers are the ones who hold the country on their shoulders" in English) may include, inter alia, "Las personas trabajadoras" as a candidate bias mitigation insight for the identified biasing term "Los trabajadores". In some embodiments, the candidate bias mitigation insight operation may also include actually replacing the identified biasing terms with the one or more candidate bias mitigation insights. In some embodiments, such replacement may be performed automatically without requirement for user interaction, and in some embodiments, such replacement operation may be performed after receipt of a confirmation from a user to continue to replace the identified biasing term(s) with the one or more candidate bias mitigation insights. In some embodiments, the replacements may be shown in a user interface showing the original (with bias) and modified (without bias) text. For example, the changes in the modified text may be shown with strike-throughs (for removed text), underlines (for added text), different color text, and/or other differences in formatting to identify the changes made in the modified text. The user interface may enable a user to selectively accept or reject the proposed changes.

As used herein, the terms "data," "content," "digital content," "digital content object," "signal," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, some-times referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

Terms such as "computing," "determining," "generating," and/or similar words are used herein interchangeably to refer to the creation, modification, or identification of data.

The term "component" or "application component" refers to a computer functionality or a set of computer functionalities, such as the retrieval of specified information or the execution of a set of operations, with a purpose that different clients may reuse for their respective purposes, together with the policies that should control its usage, for example, based on the identity of the client (e.g., an application, another component, etc.) requesting the component. Additionally, a component may support, or be supported by, at least one other component via a component dependency relationship. For example, a translation application stored on a smartphone may call a translation dictionary component at a server in order to translate a particular word or phrase between two languages. In such an example the translation application is dependent on the translation dictionary component to perform the translation task.

In some embodiments, a component is offered by one computing device over a network to one or more other computing devices. Additionally, the component may be stored, offered, and utilized by a single computing device to local applications stored thereon and in such embodiments a network would not be required. In some embodiments, components may be accessed by other components via a plurality of APIs, for example, JavaScript Object Notation (JSON), Extensible Markup Language (XML), Simple Object Access Protocol (SOAP), Hypertext Markup Language (HTML), the like, or combinations thereof. In some embodiments, components may be configured to capture or utilize database information and asynchronous communications via message queues (e.g., Event Bus). Non-limiting examples of components include an open-source API definition format, an internal developer tool, web-based HTTP components, database components, and asynchronous message queues which facilitate component-to-component communications.

In some embodiments, a component may represent an operation with a specified outcome and may further be a self-contained computer program. In some embodiments, a component from the perspective of the client (e.g., another component, application, etc.) may be a black box (e.g., meaning that the client need not be aware of the component's inner workings). In some embodiments, a component may be associated with a type of feature, an executable code, two or more interconnected components, and/or another type of component associated with an application framework.

In some embodiments, a component may correspond to a service (e.g., a web service). Additionally or alternatively, in some embodiments, a component may correspond to a library (e.g., a library of components, a library of services, etc.). Additionally or alternatively, in some embodiments, a component may correspond to one or more modules. Additionally or alternatively, in some embodiments, a component may correspond to one or more machine learning models. For example, in some embodiments, a component may correspond to a service associated with a type of service, a service associated with a type of library, a service associated with a type of feature, a service associated with an executable code, two or more interconnected services, and/or another type of service associated with an application framework.

The term "comprising" means including but not limited to and should be interpreted in the manner it is typically used in the patent context. Use of broader terms such as comprises, includes, and having should be understood to provide support for narrower terms such as "consisting of," "consisting essentially of," and "comprised substantially of".

The phrases "in one embodiment," "according to one embodiment," "in some embodiments," and the like generally mean that the particular feature, structure, or characteristic following the phrase may be included in the at least one embodiment of the present disclosure and may be included in more than one embodiment of the present disclosure. Thus, the particular feature, structure, or characteristic may be included in more than one embodiment of the present disclosure such that these phrases do not necessarily refer to the same embodiment. Further, "based on," "based at least in part on," "based at least on," "based upon," and/or similar words are used herein interchangeably in an open-ended manner such that they do not indicate being based only on or based solely on the referenced element or elements unless so indicated.

The terms "illustrative," "example," "exemplary" and the like are used herein to mean "serving as an example, instance, or illustration" with no indication of quality level. Any implementation described herein as "exemplary" is not necessarily to be construed as preferred or advantageous over other implementations.

The terms "about," "approximately," "generally," "substantially," or the like, when used with a number, may mean that specific number, or alternatively, a range in proximity to the specific number, as understood by persons of skill in the art field and may be used to refer to within manufacturing and/or engineering design tolerances for the corresponding materials and/or elements as would be understood by the person of ordinary skill in the art, unless otherwise indicated.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such a component or feature may be optionally included in some embodiments, or it may be excluded.

If the specification presents a list, unless stated otherwise, it is to be understood that each individual element of that list, and every combination of components of that list, is a separate embodiment. For example, "1, 2, 3, 4, and 5" encompasses, among numerous embodiments, 1; 2; 3; 1 and 2; 3 and 5; 1, 3, and 5; and 1, 2, 4, and 5.

The term "set" refers to a collection of one or more items.

The term "plurality" refers to two or more items.

The term "or" is used herein in both the alternative and conjunctive sense, unless otherwise indicated.

II. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, Com- pactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations. As used herein, the description may refer to a server or client device as an example "apparatus." However, elements of the apparatus described herein may be equally applicable to the claimed system, method, and computer program product. Accordingly, use of any such terms should not be taken to limit the spirit and scope of embodiments of the present disclosure.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

III. EXAMPLE FRAMEWORK

FIG. 1 illustrates an example computing system 100 in accordance with one or more embodiments of the present disclosure. As shown in FIG. 1, the computing system 100 may include a bias resolution computing entity 102 and/or one or more external computing entities 112A-N communicatively coupled to the bias resolution computing entity 102 using one or more wired and/or wireless communication techniques, such as wireless or wired network 110. The network(s) 110 may include, but are not limited to, any one or a combination of different types of suitable communications networks such as cable networks, public networks (e.g., the Internet), private networks (e.g., frame-relay networks), wireless networks, cellular networks, telephone networks (e.g., a public switched telephone network), or any other suitable private and/or public networks. Further, the network(s) 110 may have any suitable communication range associated therewith and may include, for example, global networks (e.g., the Internet), a wired or wireless Personal Area Network (PAN), Local Area Network (LAN), Metropolitan Area Network (MAN), Wide Area Network (WAN), and/or the like. In addition, the network(s) 110 may include any type of medium over which network traffic may be carried including coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing systems provided by network providers or other entities.

The bias resolution computing entity 102 may include a bias resolution system that may be specially configured to perform one or more steps/operations of one or more techniques described herein. In general, the terms computing device, entity, device, system, and/or similar words used herein interchangeably may refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes may include, for example, transmitting, receiving, operating on, processing, displaying, storing, determining, generating/creating, monitoring, evaluating, comparing, and/or similar terms used herein interchangeably. In one embodiment, these functions, operations, and/or processes may be performed on data, content, information, and/or similar terms used herein interchangeably. For example, in some embodiments, the bias resolution computing entity 102 may include and/or be in association with one or more mobile device(s), desktop computer(s), laptop(s), server(s), cloud computing platform(s), and/or the like. In some example embodiments, the bias resolution computing entity 102 may be configured to receive and/or transmit one or more datasets, objects, and/or the like from and/or to the external computing entities 112A-N to perform one or more steps/operations of one or more techniques (e.g., bias detection techniques, bias mitigation techniques, classification techniques, machine learning techniques, training techniques, and/or the like) described herein.

The external computing entities 112A-N, for example, may include and/or be associated with one or more data source entities, user computing entities, and/or the like. The external computing entities 112A-N may be configured to receive, store, manage, and/or facilitate one or more datasets that may be accessible to the bias resolution computing entity 102. The external computing entities 112A-N, for example, may provide data to the bias resolution computing entity 102 which may be leveraged to generate bias dataset(s) and/or train or fine-tune one or more machine learning models. The external computing entities 112A-N, for example, may be associated with one or more data repositories, cloud platforms, computer nodes, organizations, and/or the like, that may be individually and/or collectively leveraged by the bias resolution computing entity 102 to obtain and aggregate data regarding biasing terms, candidate bias mitigation insights, bias classifications, bias trends, and the like.

In addition, or alternatively, the external computing entities 112A-N may include one or more user devices, such as one or more laptops, mobile devices, desktop computers, and/or the like. The external computing entities 112A-N, for example, may be individually and/or collectively leveraged by the bias resolution computing entity 102 to present information to a user and/or receive user input.

The bias resolution computing entity 102 may include, or be in communication with, one or more processing elements 104 (also referred to as processors, processing circuitry, digital circuitry, and/or similar terms used herein interchangeably) that communicate with other elements within the bias resolution computing entity 102 via a bus, for example. As will be understood, the bias resolution computing entity 102 may be embodied in a number of different ways to (i) identify one or more biasing terms, (ii) generate one or more candidate bias mitigation insights, (iii) provide various user interface components, (iv) training one or more machine learning models, and/or the like. The bias resolution computing entity 102 may be configured for a particular use or configured to execute instructions stored in volatile or non-volatile media or otherwise accessible to the processing element 104 to (i) identify one or more biasing terms, (ii) generate one or more candidate bias mitigation insights, (iii) provide various user interface components, (iv) training one or more machine learning models, and/or the like. As such, whether configured by hardware or computer program products, or by a combination thereof, the processing element 104 may be capable of performing steps or operations according to embodiments of the present disclosure when configured accordingly.

In one embodiment, the bias resolution computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like, may be used to control certain aspects of the operation of the bias resolution computing entity 102 with the assistance of the processing element 104.

As indicated, in one embodiment, the bias resolution computing entity 102 may also include one or more communication interfaces 108 for communicating with various computing entities, e.g., external computing entities 112A-N, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces or user interface components for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces or user interface components from a user of the computing system 100 and provide data to a user through the user interfaces or user interface components.

While FIG. 1 illustrates certain system devices as separate, standalone devices, the various embodiments are not limited to this particular architecture.

FIG. 2 is a schematic diagram showing a system computing architecture 200 in accordance with some embodiments discussed herein. In some embodiments, the system computing architecture 200 may include the bias resolution computing entity 102 and/or the external computing entity 112A of the computing system 100. The bias resolution computing entity 102 and/or the external computing entity 112A may include a computing apparatus, a computing device, and/or any form of computing entity configured to execute instructions stored on a computer-readable storage medium to perform certain steps or operations. The bias resolution computing entity 102 may include a processing element 104, a memory element 106, a communication interface 108, and/or one or more I/O elements 114 that communicate within the bias resolution computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the bias resolution computing entity 102 to perform one or more steps/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

The bias resolution computing entity 102 may be embodied by a computer program product including non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The bias resolution computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the bias resolution computing entity 102 may communicate, via a network or communication interface 108, with one or more external computing entities such as the external computing entity 112A. The communication interface 108 may be compatible with one or more wired and/or wireless communication protocols. For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the bias resolution computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The bias resolution computing entity 102 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the bias resolution computing entity components may be located remotely from other bias resolution computing entity 102 components, such as in a distributed system. Furthermore, one or more of the components may be aggregated and additional components performing functions described herein may be included in the bias resolution computing entity 102.

FIG. 3 sets forth another example embodiment of the bias resolution computing entity 102. For example, the external computing entity 112A may access the bias resolution computing entity 102 (bias resolution system) via a web application to provide users with an accessible way to interact with the machine learning models and analyze provided textual inputs. In the depicted bias resolution computing entity 102, the Route53 component is responsible for managing subdomains and redirection routes to components accordingly. The EKS component allows for easy growth as the use of the system increases and scaling of the application by enabling multiple machines to operate in parallel running different replicated services or to have two (or more) machines answering queries. The ELB component is a load balancing service responsible for evenly distributing the load between different replicas of the services and avoiding collapse of the platform due to intensive use. The EC2 components are servers for hosting the different applications or services that will be executed by the system (e.g., the API and the web application). The relational database service (DBS) component stores the different user interactions with the system in order to keep the files each user uploaded, save the result of the model execution for the uploaded file, etc. The S3 file storage service component oversees and keeps the different documents loaded on the system and further allows many documents to be loaded without space or performance issues. The Cognito component provides user authentication and/or authorization service by storing passwords, permissions, basic user information, etc. and further allows to delegate authentication responsibility to a service created for this purpose with updated industry standards.

Turning to the model micro-services, the API Gateway component is responsible for receiving file or text processing queries from other services (e.g., API). The API Gateway can handle many queries in parallel and trigger processes in charge of answering those queries. The SQS component is a processing queue service that allows storing text processing requests for bias analysis and multiple consumers to get those events to be processed, without losing requests in the process. The Lambda component is responsible for processing the different bias analysis events using the machine learning model(s) and delivering the response(s). The ECR component is responsible for saving the different versions of the machine learning model(s) and ensuring that the Lambda components always use the latest version to perform the processing.

Turning to the external computing entity 112A of FIG. 2, the external computing entity 112A may include an external entity processing element 210, an external entity memory element 212, an external entity communication interface 224, and/or one or more external entity I/O elements 218 that communicate within the external computing entity 112A via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216, which may be embedded and/or may be removable. The external entity communication interface 224 may include one or more wired and/or wireless communication interfaces as described with reference to communication interface 108. In some embodiments, the external entity communication interface 224 may be supported by one or more radio circuitry. For instance, the external computing entity 112A may include an antenna 226, a transmitter 228 (e.g., radio), and/or a receiver 230 (e.g., radio), with the external entity processing element 210 providing signals to and receiving signals from the transmitter 228 and receiver 230, respectively.

Signals provided to and received from the transmitter 228 and the receiver 230, correspondingly, may include signaling information/data in accordance with air interface standards of applicable wireless systems to communicate with various devices, such as a bias resolution computing entity 102, another external computing entity 112N, and/or the like. In this regard, the external computing entity 112A may be capable of operating with one or more air interface standards, communication protocols, modulation types, and access types. More particularly, the external computing entity 112A may operate in accordance with any of a number of wireless communication standards and protocols, such as those described above with regard to the bias resolution computing entity 102. In an example embodiment, the transmitter 228 and/or receiver 230 are configured to communicate via one or more SRC protocols. For example, the transmitter 228 and/or receiver 230 may be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, ZWave protocols, 6LoWPAN protocols, and/or other short range communication protocol. In various embodiments, the antenna 226, transmitter 228, and receiver 230 may be configured to communicate via one or more long range protocols, such as GPRS, UMTS, CDMA200, 1×RTT, WCDMA, GSM, EDGE, TD-SCDMA, LTE, E-UTRAN, EVDO, HSPA, HSDPA, Wi-Fi, Wi-Fi Direct, WiMAX, and/or the like.

In this regard, the external computing entity 112A may be capable of operating with one or more air interface standards, communication protocols, modulation types, and access types. More particularly, the external computing entity 112A may operate in accordance with any of a number of wireless communication standards and protocols. In a particular embodiment, the external computing entity 112A may operate in accordance with multiple wireless communication standards and protocols, such as GPRS, UMTS, CDMA200, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the external computing entity 112A may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112A may also download changes, add-ons, and updates, for instance, to its firmware, software (e.g., including executable instructions, applications, program modules), operating system, and/or the like.

According to one embodiment, the external computing entity 112A may include location determining embodiments, devices, modules, functionalities, and/or the like. For example, the external computing entity 112A may include outdoor positioning embodiments, such as a location module adapted to acquire, for example, location data including latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112A in connection with a variety of other systems, including cellular towers, Wi-Fi access points, and/or the like. Similarly, the external computing entity 112A may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, mouse, microphone, and/or the like) that may be coupled to the external entity processing element 210. For example, the user interface may be configured to provide an application (e.g., mobile app), browser, interactive user interface, dashboard, webpage, and/or similar words used herein interchangeably executing on and/or accessible via the external computing entity 112A to cause display or audible presentation of information/data and for user interaction therewith via one or more user input interfaces. In one embodiment, the functionality described herein (and user interface) may be provided as a standalone app executing on the external computing entity 112A. In such an implementation, the standalone app may be integrated with a variety of other apps executing on the external computing entity 112A to provide authentication functionality for other apps. For example, the user interface may be a user application, browser, and/or similar words used herein interchangeably executing on and/or accessible via the external computing entity 112A to interact with and/or cause the display, announcement, and/or the like of information/data to a user.

The user input interface may include any of a number of input devices or interfaces allowing the external computing entity 112A to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112A and may include a full set of alphabetic keys or set of keys that may be activated to provide a full set of alphanumeric keys. Through such inputs, the external computing entity 112A may capture, collect, store information/data, user interaction/input, and/or the like. In addition to providing input, the user input interface may be used, for example, to activate or deactivate certain functions, such as screen savers, sleep modes, and/or the like.

IV. EXAMPLE SYSTEM OPERATIONS

As indicated, various embodiments of the present disclosure make important technical contributions to machine learning and bias resolution technologies. In particular, systems and methods are disclosed herein that implement machine learning techniques and machine learning models for automatically detecting potentially biasing terms and generating candidate bias mitigation insights. These and other benefits may be achieved through specifically trained machine learning models, including through the use of a single machine learning model, or a pipeline of machine learning models that operate together, to provide the data output results as discussed herein.

FIG. 4 provides a flowchart diagram of an example process 400 for training a machine learning model in accordance with some embodiments discussed herein. FIG. 4 illustrates an example process 400 for explanatory purposes. Although the example process 400 depicts a particular sequence of steps/operations, the sequence may be altered without departing from the scope of the present disclosure. For example, some of the steps/operations depicted may be performed in parallel or in a different sequence that does not materially impact the function of the process 400. In other examples, different components of an example device or system that implements the process 400 may perform functions at substantially the same time or in a specific sequence.

According to some examples, the process 400 includes, at step/operation 402, receiving a DLB for one or more machine learning models. For example, the bias resolution computing entity 102 may receive the DLB for one or more machine learning models. The DLB may be in any format. In a non-limiting example, the DLB is a JSON file. In some embodiments, the DLB may be structured to include a plurality of text samples with corresponding bias identifications (e.g., a bias corpus including a collection of predefined biasing terms aggregated from a plurality of data sources), positioning of the identified bias in each text sample, and bias classifications. For example, the DLB may be developed in accordance with a bias criterion or bias manual containing taxonomy and characterization of different kinds of biases and providing guidelines for identifying and classifying such biases. That is, the bias criterion may define a plurality of bias classifications and for each bias classification, a corresponding description for identifying a biased text as encompassed by the respective bias classification as set forth in the example bias classifications and descriptions set forth in Table 1:

TABLE 1

| Bias Classification or Category | Bias Classification Description | Sub-Classification (Sub-Category) | Sub-Classification Description |
|---|---|---|---|
| Age | Expressions or terms that negatively refer to the age or age group to which a person belongs, mainly older adults. They are words that negatively denote the person's age ('el viejo'), use the name of the age group to name someone in a negative way ('eres un niño'), or refer to diseases and conditions associated with age ('Senil'). | Age stereotype | Expressions that emphasize a person's age or age group, standing out as the predominant aspect of their identity |
| | | Negative age term | Negative terms to refer to diseases and conditions associated with age |
| Gender | Expressions or terms that discriminate against the female gender, making invisible or presenting subjects with this identity in a negative way. This may include the use of terms or expressions that favor one gender over another, such as the use of masculine as a universal generic, the use of masculine pronouns to refer to a mixed group, or the choice of names of positions and professions in masculine when refers to a set of people of different genders. | Masculine generalization | Using the masculine form in words (nouns and adjectives) to refer to mixed groups of people. |
| | | Masculine pronouns as generics | Using masculine pronouns to refer to a group (e.g., 'aquellos', 'nosotros') |
| | | Gender asymmetry | Expressions that denote asymmetries between the masculine and feminine gender (e.g., metaphors, idiomatic phrases, diminutives, and insulting expressions) |
| | | Profession in masculine | Use of the names of positions and professions in masculine to refer to a group |
| Race/ Ethnicity/ Nationality | Expressions or terms that refer to the manifestation of prejudices and discrimination in relation to physical characteristics (race), cultural characteristics (ethnicity) or the legal connection of people to a group (nationality). This may include references to skin color, use of the term "minoria" (minority) in a pejorative manner, stereotypes based on physical features, and the use of offensive terms to marginalize racial groups. | Minorities | Use of the concept minority to refer to a group of people, implying that said group is inferior, oppressed, or deficient compared to the total population. |
| | | Skin color stereotype | Use of words, phrases or terms that implicitly or explicitly perpetuate prejudices, stereotypes or discrimination based on people's skin tone |
| | | Stereotype of physical traits | Simplification and stereotyping of people based on their observable physical traits |
| | | Racial stereotype | Use of pejorative terms to stigmatize and marginalize a racial group, perpetuating stereotypes of oppression and discrimination |
| Sexual Orientation | Expressions or terms that refer to attitudes, prejudices, or discrimination in relation to the type of sexual attraction that a person feels towards another. These biases may include the use of words that are offensive | Outdated, insulting term when referring to OS (sexual orientation) | Use of obsolete expressions and vocabulary that historically stigmatized groups related to sexual orientation, which |

TABLE 1-continued

| Bias Classification or Category | Bias Classification Description | Sub-Classification (Sub-Category) | Sub-Classification Description |
|---|---|---|---|
| | and derogatory towards people due to their sexual orientation and the use of the suffix -ism in a negative way when referring to people with non-heterosexual sexual orientations (e.g., 'homosexualismo', 'lesbianismo'). | Pejorative expression when referring to OS (sexual orientation) | today is perceived as insulting and discriminatory. Use of terms and expressions that, consciously or unconsciously, are offensive and derogatory towards people due to their sexual orientation, perpetuating negative stereotypes and causing harm. |
| | | Suffix -ism when referring to OS (sexual orientation) | Use of the suffix -ism in a negative way to refer to people with non-heterosexual sexual orientations |
| Religion | Use of terms or expressions that, in a negative or derogatory way, relate to religion or the people who practice it. | | |
| Socioeconomic | Use of pejorative expressions related to a person's socioeconomic level, mainly those from lower classes. | | |
| Disability | Use of expressions that highlight the need for assistance, restriction, and stereotypes of disabilities | | |
| Personal Characteristics | Use of derogatory terms or adjectives to identify a person based on personal characteristics, such as physical defects or socially disparaged attributes, with the purpose of belittling or humiliating. | | |
| Violent | Expressions that are not biased but denote violent language that should not be used since it seeks to insult or humiliate people (e.g., "garabatos") | | |

In other embodiments, the bias criterion may be unstructured, for example, as a natural language description or definition of each type of bias. The machine learning model may be configured to apply the instructions/definitions reflected within the unstructured data by training the machine learning model using a large corpus of training data encompassing natural language text.

Accordingly, in some embodiments, the DLB comprises a plurality of natural language text samples (which may be provided in written form or may be transcribed from an audio sample), each text sample including metadata identifying a position of at least one identified biased text (e.g., counting the number of words or characters within the text sample to the start of an identified biased text sample), bias classification information of the at least one identified biased text, and at least one bias mitigation text corresponding to the at least one identified biased text. In some embodiments, the DLB may be language-specific. In a non-limiting example, the DLB may be developed based on Spanish-language texts (or other language texts), which may include or exclude biases or otherwise differ as compared to English-language texts since the gender of a noun is an essential part of the Spanish language. In some embodiments, the DLB may include any number of language-based texts For example, in a non-limiting example, the DLB may include texts from more than one language (e.g., English-language texts, Spanish-language texts, and French-language texts).

An example of the metadata set forth in a Spanish-language DLB before the preprocessing of step/operation 404 is set forth below:

```
{'annotations':    [{'completed_by': 2,
                      'created_at': '2023-05-25T12:10:29.268733Z',
                      'ground_truth': False,
                      'id': 3168,
                      'lead_time': 208.43400000000003,
                      'parent_annotation': None,
                      'parent_prediction': None,
```

'prediction': {},
'project': 8,
'result':    [{'from_name': 'label',
              'id': 'aG12xeGGF0',
              'origin': 'manual',
              'to_name': 'text',
              'type': 'labels',
              'value':    {'end': 11,
                          'labels': ['m_generico'],
                          'start': 0,
                          'text': 'Los Jóvenes'}},
             {'from_name': 'mitigation',
              'id': 'X0YhNLBHXM',
              'origin': 'manual',
              'to_name': 'text'
              'type': 'textarea',
              'value': {'text':      ['Las Personas Jóvenes y el '
                                      'Mercado Laboral | Las y los '
                                      'Jóvenes y el Mercado'
                                      'Laboral']}},
             {'from_name': 'label',
              'id': 'K9-CxCsKPa',
              'origin': 'manual',
              'to_name': 'text',
              'type': 'labels',
              'value':    {'end': 11,
                          'labels': ['Personas'],
                          'start': 0,
                          'text': 'Los Jóvenes'}}],
          'result_count': 0,
          'task': 23852,
          'updated_at': '2023-05-31T19:50:35.772101Z',
          'was_cancelled': False}],
'cancelled_annotations': 0,
'comment_authors': [ ],
'comment_count': 0,
'created_at': '2023-05-23T02:31:52.193661Z',
'data':      {'URL': 'https://gobierno.uai.cl/los-jovenes-y-el-mercado-laboral/',
            'id': 1,
            'text': 'Los Jóvenes y el Mercado Laboral'},
'drafts': [ ],
'file_upload': 'a5bcb139-4-05-23.xlsx_-_Sheet1.csv',
'id': 23852,
'inner_id': 1,
'last_comment_updated_at': None,
'meta': { },
'predictions': [ ],
'project': 8,
'total_annotations': 1,
'total_predictions': 0,
'unresolved_comment_count': 0,
'updated_at': '2023-05-31T19:50:35.826964Z',
'updated_by': 2}

According to some examples, the process 400 includes, at step/operation 404, performing one or more data processing techniques to the DLB. For example, the bias resolution computing entity 102 may perform one or more data processing techniques to the DLB to preprocess or otherwise facilitate or prepare the DLB for consumption by the one or more machine learning models. In some embodiments, the bias resolution computing entity 102 may perform an extraction process to each text sample to extract identified bias term(s), one or more bias classification labels for each identified bias term, and the positioning of each identified bias term. In some further embodiments, the possible ways to correct the identified bias term(s) to eliminate or otherwise mitigate the bias is determined from each text sample of the DLB. For example, the bias data set may comprise data providing example modifications to the text to eliminate/mitigate the classified biases therein.

In some embodiments, the bias resolution computing entity 102 may perform a tokenization operation or otherwise provides the identified bias terms to a pre-trained tokenizer to split words of the identified bias terms into a list, array, or sequence of one or more tokens for consumption by the one or more machine learning models. Each token may comprise one word or phrase (encompassing a plurality of words) and may be assigned a label (e.g., a hash) to enable the bias resolution computing entity 102 to identify each token. For example, a tokenization operation may be performed on each identified bias term of the DLB to generate a list, array, or sequence of one or more tokens for each identified bias term. In some embodiments, a tokenization operation is a data entity that describes one or more actions configured to segment text data into one or more tokens (e.g., smaller units). For instance, a tokenization operation may be configured to segment an identified bias term into one or more tokens. The one or more tokens, for example, may include a phrase, a word, and/or the like. In this way, an identified bias term (for example, a 3-word text string) may be decomposed into a plurality of word tokens that may be analyzed individually and/or in one or more combinations using some of the techniques of the present disclosure. In some examples, a pre-trained tokenizer model may be utilized or otherwise leveraged to segment textual data into one or more tokens (e.g., tokenized textual data). In some examples, the tokenizer model may include a bidirectional encoder representation from transformers (BERT) tokenizer (or BETO, which is a Spanish version of BERT). By way of example, output of a tokenization operation performed on example textual data "Promoting diversity and inclusion" may include "Promoting" word token, "diversity" word token, "and" word token, and/or "inclusion" word token.

The output of the step/operation 404 is a tokenized DLB configured for consumption by the one or more machine learning models as training data. For example, the tokenized DLB may comprise a plurality of tokens arranged in a list, array, or sequence of tokens with their respective bias classification labels. That is, tokens that have no bias may be labeled "O" and tokens that are part of an identified bias may be labeled with "B.B.Gender", for example, if they mark the beginning of a gender bias or "I.B.Gender", for example, if they are not the starting token, but are still part of the identified bias.

According to some examples, the process 400 includes, at step/operation 406, training the one or more machine learning models with the tokenized DLB as training data. For example, the bias resolution computing entity 102 may generate two subsets from the tokenized DLB, including a training subset that contains some amount (e.g., 80% of the data points) of the data points of the tokenized DLB and another subset containing the remaining data points (e.g., 20% of the data points) to serve as an evaluation or validation subset. Such evaluation or validation subset may be used to determine if the one or more machine learning models are operating correctly compared to the original DLB.

Some embodiments of the present disclosure may implement a training feedback loop that is derived from optimized insights and/or an increasing corpus of training data. For example, as new data is analyzed by the trained model(s) and/or critiqued by users, such data may then be added back into the training data in a feedback loop, thereby increasing the corpus of training data and continually refining the model(s) and/or training the model(s) to identify new biases and/or new candidate bias mitigation insights. For example, user selections and modifications captured by the interactive user interfaces of the present disclosure may be recorded and leveraged to improve the training dataset(s) for the machine learning model(s). In this way, a feedback mechanism is implemented to iteratively improve the performance of the machine learning model(s).

It is contemplated that the techniques of the present disclosure may be applicable to any type of machine learning model, algorithm, and/or the like. The inputs, outputs, and/or labels may be based at least in part on the type, purpose, and/or architecture of the particular machine learning model. In a non-limiting example, using a deep learning python library to facilitate the training process, the training subset is loaded into a pre-trained BETO model, and the weights are iteratively adjusted using an optimization procedure. That is, in such example, the machine learning model may be a large language model based on foundation models, however, such foundation models are trained with large volumes of data (e.g., hundreds of gigabytes or terabytes of text) that come from humans who have inherent biases such that the foundation models learn to replicate such biases during their training stages. Accordingly, the DLB and/or tokenized DLB built for this task are utilized to adjust or fine tune (e.g., practice of taking a pre-trained model and adapting it for a different or more specific task) the machine learning models of the present disclosure.

According to some examples, the process 400 includes, at step/operation 408, evaluating the one or more machine learning models. After finalizing the training process, the results of the trained or fine-tuned machine learning model may be evaluated using the evaluation or validation subset formed in step/operation 406. For example, the evaluation or validation subset of step/operation 406 (e.g., containing 20% of the data points in the above-provided example) may be used to determine if the bias detection model is correctly detecting biases and classifying such detected biases according to the classification labels of the original DLB. In a further example, such evaluation or validation subset may be used to determine if the bias mitigation model generates predictive candidate bias mitigation insights for identified bias terms in accordance with the bias mitigation text of the original DLB.

In a non-limiting example, precision, recall, and F1 metrics of the predictions of the one or more machine learning models are determined. For example, precision measures the accuracy of positive predictions, ranging from 0 to 1, recall measures the completeness of positive predictions, ranging from 0 to 1, and F1 is the harmonic mean between precision and recall, ranging from 0 to 1. In a non-limiting example gender biases detection performed by a fine-tuned bias detection model according to the present disclosure, the training process of step/operation 406 resulted in 0.67 precision, 0.8 recall, and 0.73 F1. Accordingly, in this example, the training process of step/operation 406 has a performance level of 80% in terms of gender bias detection of an example bias detection model of the present disclosure. FIG. 5 illustrates the evolution of performance as more data are incorporated into the training of a gender bias detection model.

FIG. 6 is a flowchart showing steps of an example process 600 for generating and outputting one or more candidate bias mitigation insights to a user in accordance with some embodiments discussed herein. FIG. 6 illustrates an example process 600 for explanatory purposes. Although the example process 600 depicts a particular sequence of steps/operations, the sequence may be altered without departing from the scope of the present disclosure. For example, some of the steps/operations depicted may be performed in parallel or in a different sequence that does not materially impact the function of the process 600. In other examples, different components of an example device or system that implements the process 600 may perform functions at substantially the same time or in a specific sequence.

According to some examples, the process 600 includes, at step/operation 602, receiving a document comprising textual data. For example, the bias resolution computing entity 102 may receive the document comprising textual data. The document may be in any of a variety of formats or sizes, including but not limited to, at least natural language text (e.g., multi-paragraph memos, letters, pleadings, electronic communications, press releases, advertisements, marketing materials, applications, proposals, meeting minutes, notes, forms, spreadsheets, slideshows, transcribed text, articles, papers, contracts, technical descriptions, product specifications, as well as direct message conversation transcripts, scripts (e.g., for screenplays) including lines spoken by multiple characters/individuals, etc.) Such documents may be internal-facing or external facing of an organization, whether private or public.

Figure 7A:
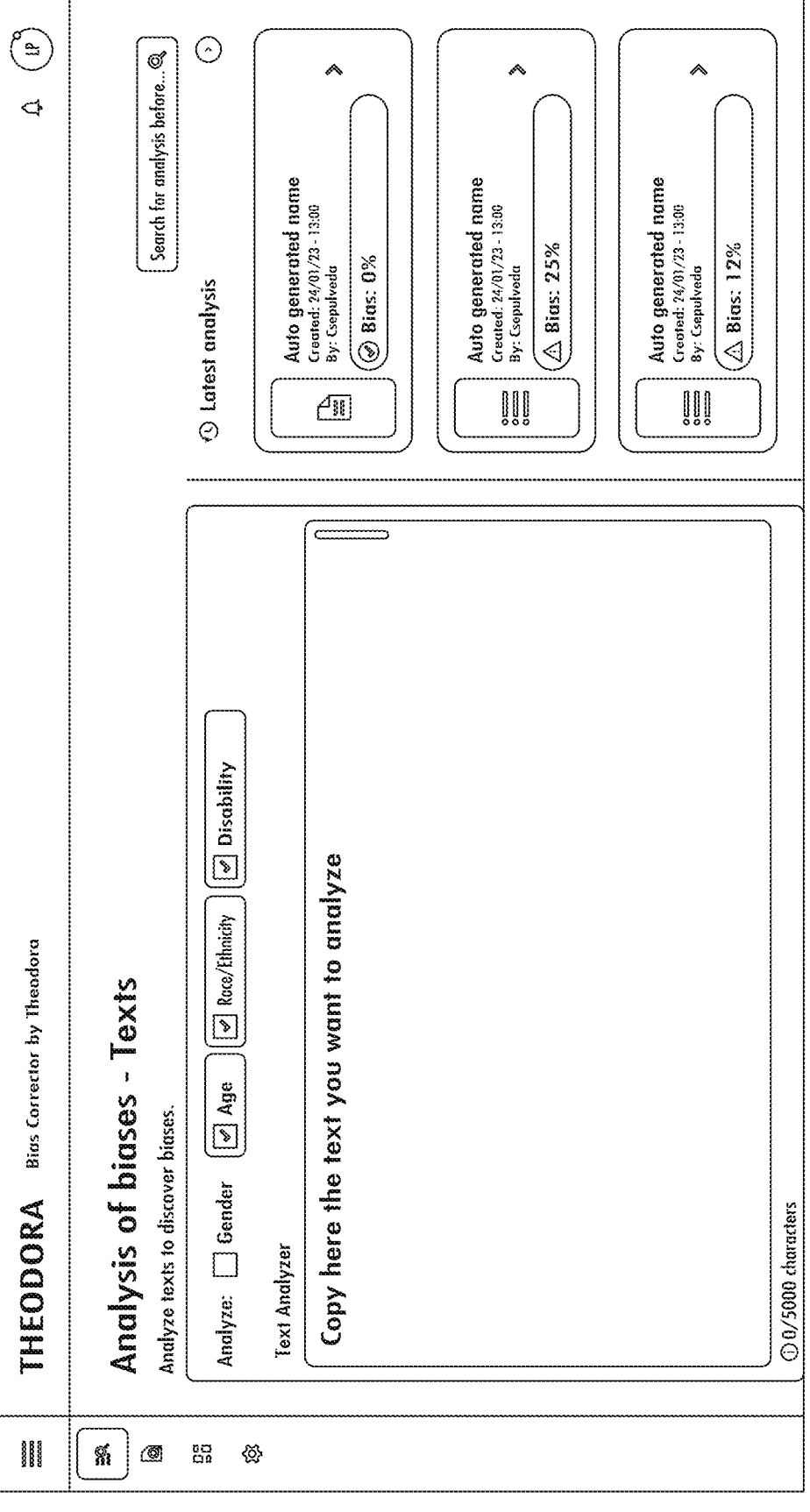

The bias resolution computing entity 102 may receive the document via a variety of methods. For example, the bias resolution computing entity 102 may be accessible to an external computing entity 112A via a web application such that the user submits the document via a web application user interface. For example, FIG. 7A depicts an example user interface for submitting text to be analyzed in accordance with some embodiments discussed herein. In some embodiments, the example user interface may be configured to receive a selection of one or more biases to analyze in the text. For example, in FIG. 7A, the biases of Age, Race/Ethnicity, and Disability have been selected by the user as depicted by the checkmark next to each such bias and the bias of Gender has not been selected by the user as depicted by the lack of a checkmark next to such bias. In the non-limiting embodiment depicted in FIG. 7A, the user may manually enter (or cut and paste) the text to be analyzed. It is further contemplated that the user may submit the text to be analyzed in any of number of ways, such as dragging and dropping the text from a word processing program. In another non-limiting embodiment, an application may be installed on the external computing entity 112 as a stand-alone application or as an add-in for word processing applications, and the application or add-in may be configured to monitor (e.g., continuously, or intermittently) for documents comprising textual data, without requiring a user to proactively submit a document to the bias resolution computing entity 102. The example user interface depicted in FIG. 7A further depicts a summary of recent analyses performed, including a color-coded visual emphasis element corresponding to an amount or percentage of bias detected by the bias resolution computing entity 102. For example, as depicted in FIG. 7A, a recent textual analysis contained 0% bias and may be associated with a green visual emphasis element as well as a checkmark. In another depicted example, a textual analysis contained 25% bias and may be associated with a red visual emphasis element as well as a warning sign (e.g., exclamation point within a triangle). In still another depicted example, a textual analysis contained 12% bias and may be associated with an orange visual emphasis element as well as a corresponding warning sign (e.g., exclamation point within an octagon).

According to some examples, the process 600 includes, at step/operation 604, performing, using one or more machine learning models, a tokenization operation based at least in part on the textual data. For example, the bias resolution computing entity 102, using one or more machine learning models, may perform a tokenization operation based at least in part on the textual data as described herein. In some embodiments, a machine learning model may perform a tokenization operation to segment text data (e.g., from the textual data) into one or more tokens (e.g., smaller units), such as tokenized textual data. The one or more tokens, for example, may include a phrase, a word, and/or the like. For example, the tokenization operation (e.g., a tokenizer model) may be configured to analyze the surrounding context of each word to determine whether the word is a stand-alone word token, or whether the word should be included in a token that represents a token phrase (e.g., United States).

In some examples, the bias detection model may include a tokenizer model to perform such tokenization operation. For example, a tokenizer model may be utilized to segment textual data into one or more tokens. In some examples, the tokenizer model may include a bidirectional encoder representation from transformers (BERT) tokenizer (or BETO, which is a Spanish version of BERT). By way of example, output of a tokenization operation performed on example textual data "Promoting diversity and inclusion" may include "Promoting" word token, "diversity" word token, "and" word token, and/or "inclusion" word token. In other embodiments, the tokenizer model may be a separate machine learning model from the bias detection model.

According to some examples, the process 600 includes, at step/operation 606, identifying, using the one or more machine learning models, one or more biasing terms based at least in part on the textual data. For example, the bias resolution computing entity 102, using one or more machine learning models, may identify one or more biasing terms based at least in part on the tokenized textual data. In some embodiments, the bias resolution computing entity 102 may input the tokenized textual data from step/operation 604 into a machine learning model, such as a machine learning bias detection model, wherein the bias resolution computing entity 102, using the machine learning bias detection model, detects one or more biasing terms in the textual data. In some embodiments, the bias resolution computing entity 102 the tokenizer model may be the same machine learning bias detection model.

The bias detection model may be configured, trained, and/or the like to perform a biasing term identification operation, a bias classification tagging operation, and/or a bias positioning tagging operation as described herein in order to identify one or more biasing terms in the textual data. In some embodiments, the bias detection model may perform a biasing term identification operation to detect and/or identify one or more biasing terms in the textual data. For example, a biasing term identification operation may include predicting one or more words or phrases as a biasing term based on analysis of tokenized textual data (e.g., tokens) and identifying and/or assigning the word(s) or phrase(s) as a biasing term. For example, in some embodiments, this is a neural network operation wherein the tokens are vectorized and fed into a multi-level neural network that is trained (e.g., from the process 400 as described herein) to identify biases and assign a probability score for each bias, and the bias with the highest probability score is identified for each token.

The bias resolution computing entity 102, via the machine learning bias detection model, may generate a bias classification label and a bias position identification for each of the one or more detected biasing terms. That is, in some embodiments, the bias detection model may perform a bias classification tagging operation to determine the bias classification (e.g., age, gender, race/ethnicity/nationality, sexual orientation, religion, socioeconomic, disability, personal characteristics, violent, and/or the like) and/or sub-classification (e.g., age stereotype, negative age limitation, masculine generalization, masculine pronouns as generics, gender asymmetry, profession in masculine, minorities, skin color stereotype, stereotype of physical traits, racial stereotype, outdated/insulting term when referring to sexual orientation, pejorative expression when referring to sexual orientation, suffix-ism when referring to sexual orientation, and/or the liked) associated with a biasing term and/or word token. In some embodiments, such association may be adding or appending metadata for storage with the corresponding token, or otherwise appending an identifier onto the token to identify what bias is included. For example, a bias classification tagging operation may include predicting the bias classification for a biasing term or word token and assigning the bias classification to the biasing term or word token. In some embodiments, a biasing term and/or word token may not be associated with or predicted to be associated with any bias classification. Such biasing term and/or word token may be tagged with "O" or some other indication of lack of predicted bias classification. That is, the present disclosure contemplates that one or more tokens (e.g., tokenized words, strings, phrases) may be free of bias. In some embodiments, such tokens may be classified as "no bias" or otherwise without bias (e.g., due to a low probability score for each available bias classification). For example, such tokens may be labeled as "O" to reflect the absence of bias classification. The subsequent provision to the bias mitigation model does not proceed to propose any changes or candidate mitigation bias insights for such tokens/strings of tokens that receive a "no bias" classification.

In some embodiments, the bias classification tagging operation may also include an additional labeling of an individual word token which identifies a location of the individual word token in the identified biasing term. For example, in addition to predicting the bias classification for each word token in an example biasing term as a gender bias, the bias classification tagging operation may also include identifying whether the word token is a "beginning token" that marks the beginning of the identified bias or as an "identified token" that marks the word token as not the beginning token but still part of the identified bias. By way of non-limiting example, output (e.g., bias classification label) of a bias classification tagging operation performed on the Spanish input text "Los trabajadores de clase media son los que sostienen al país sobre sus hombros" (e.g., which translates to "The workers are the ones who hold the country on their shoulders" in English) may include, inter alia, "Los trabajadores" as "B-B.Gender", which identifies "Los trabajadores" as a gender bias (e.g., a generalization of a group of people using the masculine gender in Spanish) and a beginning token.

In some embodiments, the bias detection model may perform a bias positioning tagging operation to determine the position of a biasing term and/or word token in textual data. For example, a bias positioning tagging operation may include predicting the position for a biasing term or word token and assigning the bias position identification to the biasing term or word token. That is, in some embodiments, the bias positioning tagging operation comprises identifying a position of at least one identified biased text (e.g., counting the number of words or characters within the text sample to the start of an identified biased text sample). For example, the starting position of an identified biased text may be determined as relative to the beginning of the original text. By way of another non-limiting example, output (e.g., bias position identification) of a bias positioning tagging operation performed on the Spanish input text "Los trabajadores de clase media son los que sostienen al país sobre sus hombros" (e.g., which translates to "The workers are the ones who hold the country on their shoulders" in English) may include, inter alia, predicting and/or identifying "Los trabajadores" as occurring at characters 0 to 16 of the textual data (e.g., [0,16]).

Figure 7B:
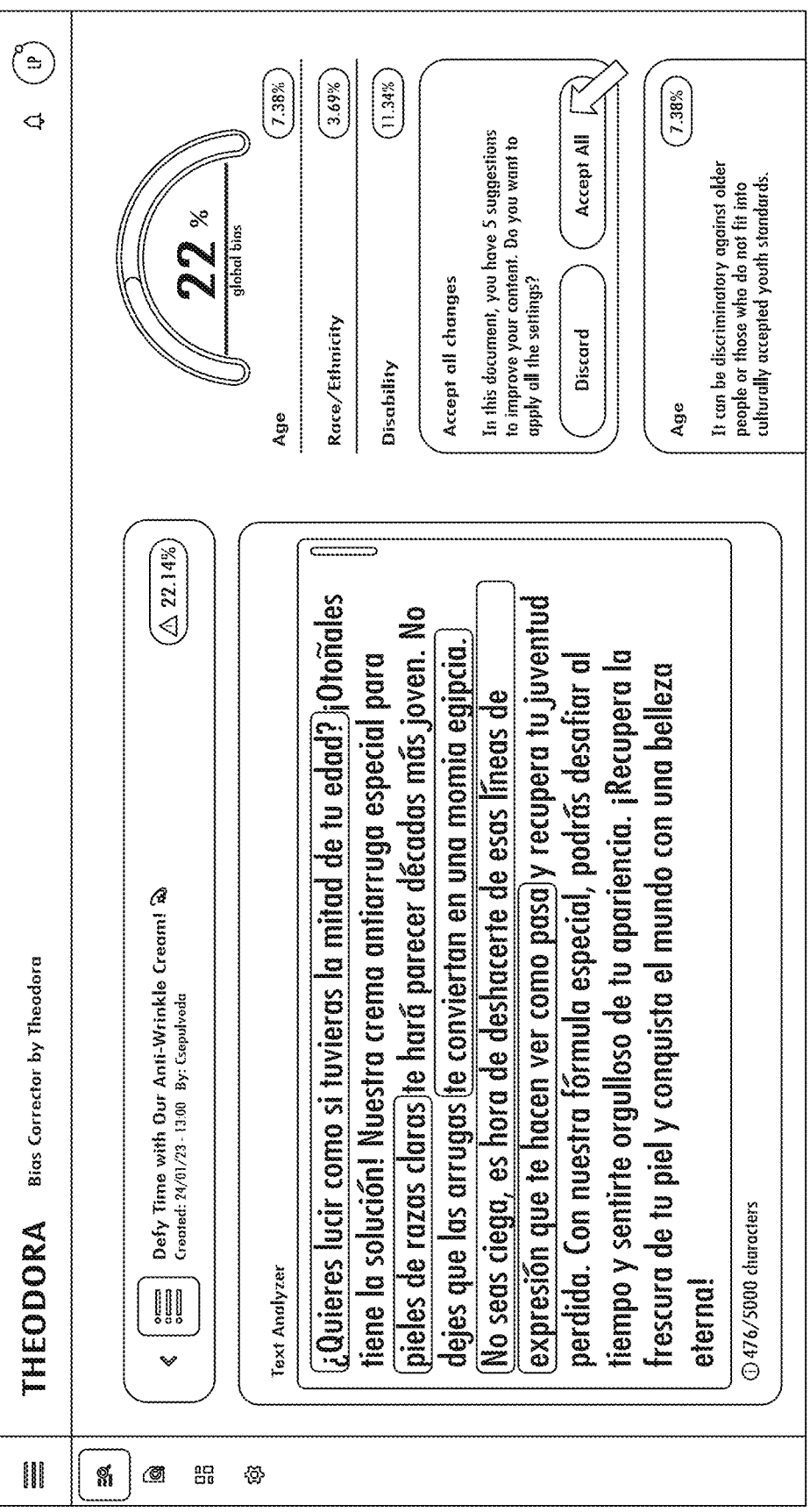

An example output of the machine learning bias detection model in step/operation 604 is set forth below:
{"execution time": 1.1949119567871094,
    "original text": "Los trabajadores de clase media son
        los que sostienen al país sobre sus hombros",
    "predictions": [
        [[0,16], "B-B. Gender"]],
]}
FIG. 7B depicts an example user interface for highlighting or otherwise emphasizing the bias terms or phrases identified in step 606, for example, in accordance with some embodiments discussed herein. For example, as depicted in a text analyzer portion of the user interface of FIG. 7B, several phrases that have been identified as bias terms or phrases in step 606 are highlighted and/or emphasized for display to the user (e.g., "¿Quieres lucir como si tuvieras la mitad de tu edad?", "pieles de razas claras", "the conviertan en una momia egipcia" and "No seas ciega, es hora de deshacerte de esas lineas de expression que the hacen ver como pasa" have been highlighted and underlined in the text analyzer portion of the user interface). In some embodiments, the example user interface may be configured to display an overall bias percentage (e.g., "22% global bias") and/or bias percentages for detected biases (e.g., "Age 7.38%", "Race/Ethnicity 3.69%", "Disability 11.34%") as depicted in FIG. 7B.

According to some examples, the process 600 includes, at step/operation 608, generating, using the one or more machine learning models, one or more candidate bias mitigation insights. For example, the bias mitigation model may include one or more models configured, trained, and/or the like to predict and/or generate one or more candidate bias mitigation insights and/or to replace an identified biasing term with a corresponding candidate bias mitigation insight.

In some embodiments, a candidate bias mitigation insight comprises one or more proposed changes (e.g., a proposed replacement text string) to the identified bias term or phrase. For example, such proposed changes may be reflected as an "in-line" change wherein the bias mitigation model (via the bias resolution system/bias resolution computing entity) generates replacement text. In some embodiments, the bias mitigation model may be an LLM trained and/or configured with proper grammar and meaning of words (e.g., based on the large corpus of training data) that enables the bias mitigation model to draft grammatically correct phrasing with the same meaning as what was originally included in the identified biased text. In a non-limiting example, the identified biased text may be "a good employee always puts his tools away" and the candidate bias mitigation insight generated by the bias mitigation model may propose a replacement text such as "a good employee always puts their tools away."

Additionally or alternatively, in some embodiments, a candidate bias mitigation insight comprises a comment and/or instruction to the user that a particular word/phrase reflects a bias with instructions to change that phrasing/word choice (e.g., textual instructions to rephrase the corresponding biasing term). For example, in some embodiments, the bias mitigation model may be an LLM trained and/or configured to generate such comment and/or instruction text naturally. Additionally or alternatively, the bias mitigation model may be an LLM trained and/or configured to select pre-drafted texts selected from memory for presentation to the user. Such candidate bias mitigation insights comprising comments and/or instructions may not be reflected as changes "in-line" in the text, but rather flag, highlight, or otherwise notate the identified bias term or phrase and present a high-level suggestion to change the identified bias term or phrase. In a non-limiting example, such a candidate bias mitigation insight may be "This phrase could be construed as gender-biased. You can improve this phrasing by removing male-centric wording."

Figure 7C:
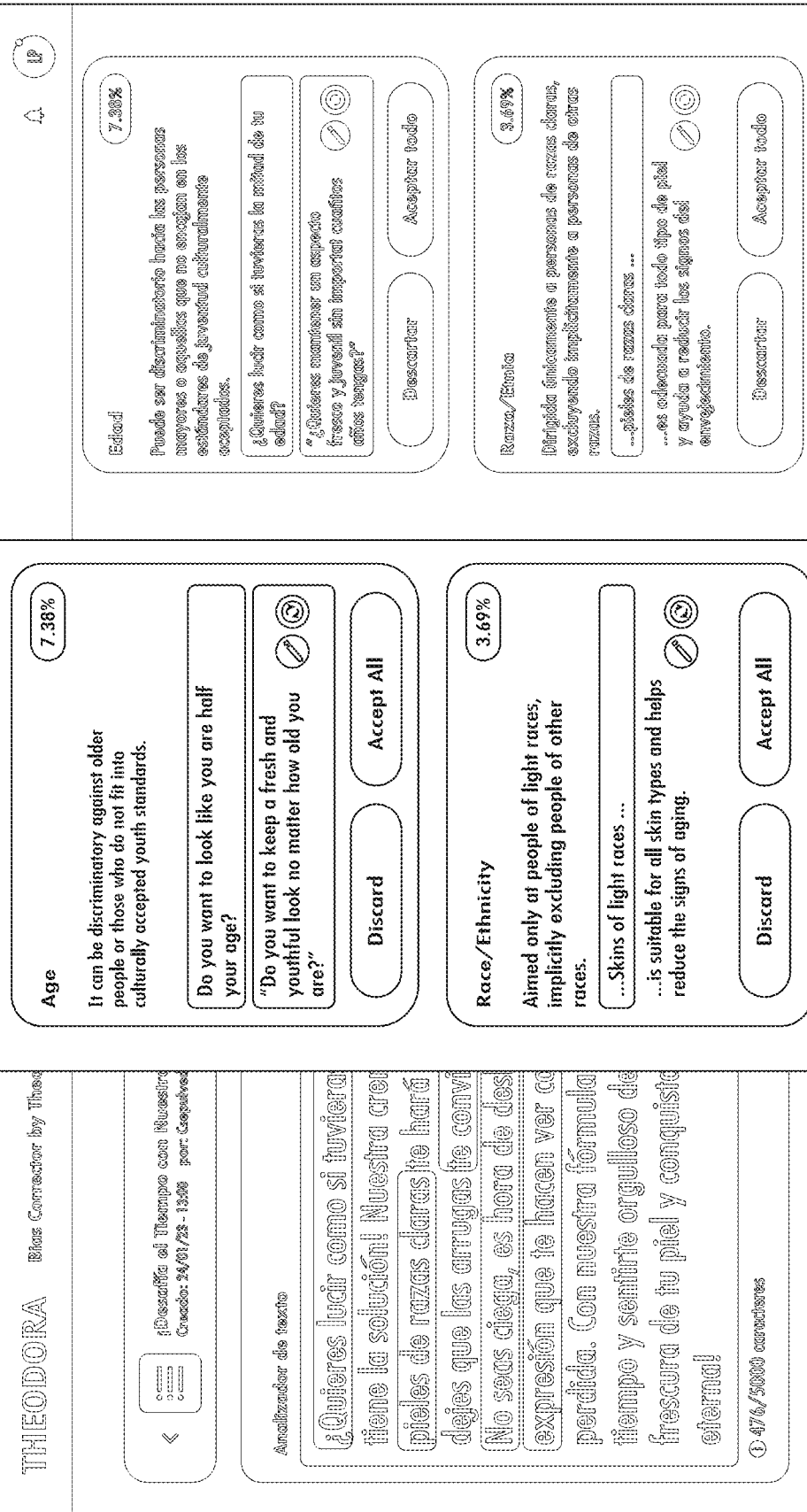

In some embodiments, the bias mitigation model may be trained and/or configured to identify (e.g., flag) bias terms or phrases and the bias resolution computing entity 102 (bias resolution system) may be configured to receive user input from a user asking the bias resolution computing entity 102 to re-write the identified bias term phrasing (e.g., if the user does not feel comfortable rewriting the phrasing themselves). That is, in some embodiments, the bias mitigation model may be configured to receive one or more prompts from a user to provide different types of output. For example, as depicted in FIG. 7B, the example user interface may be configured to receive input from the user regarding whether the user would like to accept all suggestions for improving the submitted content (e.g., "In this document, you have 5 suggestions to improve your content. Do you want to apply all the settings?, "Discard", "Accept All", etc.). As depicted in FIG. 7C, an example user interface component may be presented to the user in response to the user selecting or otherwise indicating a request for further information with respect to the identified bias phrase (e.g., selecting the emphasized text in FIG. 7B, selecting the bias percentage in FIG. 7B, or the like). For example, as depicted in FIG. 7C, the user interface component may include a comment regarding why such phrase may be considered biased and propose a suggestion (e.g., candidate bias mitigation insight) to correct or change such identified bias term or phrase.

The one or more candidate bias mitigation insights correspond to the one or more biasing terms. That is, the candidate bias mitigation insights are linked to the one or more biasing terms identified in the original textual data. The bias resolution computing entity 102, using, for example, the bias mitigation model, may perform a candidate bias mitigation insight operation to detect and/or identify one or more candidate bias mitigation insights for potentially replacing identified biasing terms in textual data. For example, a candidate bias mitigation insight operation may include predicting one or more words or phrases as a candidate bias mitigation insight based on analysis of output from a bias detection model (e.g., biasing term(s), bias classification label, bias position identification, and/or the like) and identifying and/or assigning the word(s) or phrase(s) as a candidate bias mitigation insight. In a non-limiting example, generating the one or more candidate bias mitigation insights comprises inputting the one or more biasing terms and the corresponding bias classification labels and bias position identifications output from the machine learning bias detection model to a machine learning bias mitigation model to generate the one or more candidate bias mitigation insights. By way of non-limiting example, output (e.g., candidate bias mitigation insight) of a candidate bias mitigation insight operation performed on the Spanish input text "Los trabajadores de clase media son los que sostienen al país sobre sus hombros" (e.g., which translates to "The workers are the ones who hold the country on their shoulders" in English) may include, inter alia, "Las personas trabajadoras" as a candidate bias mitigation insight for the identified biasing term "Los trabajadores".

Figure 7D:
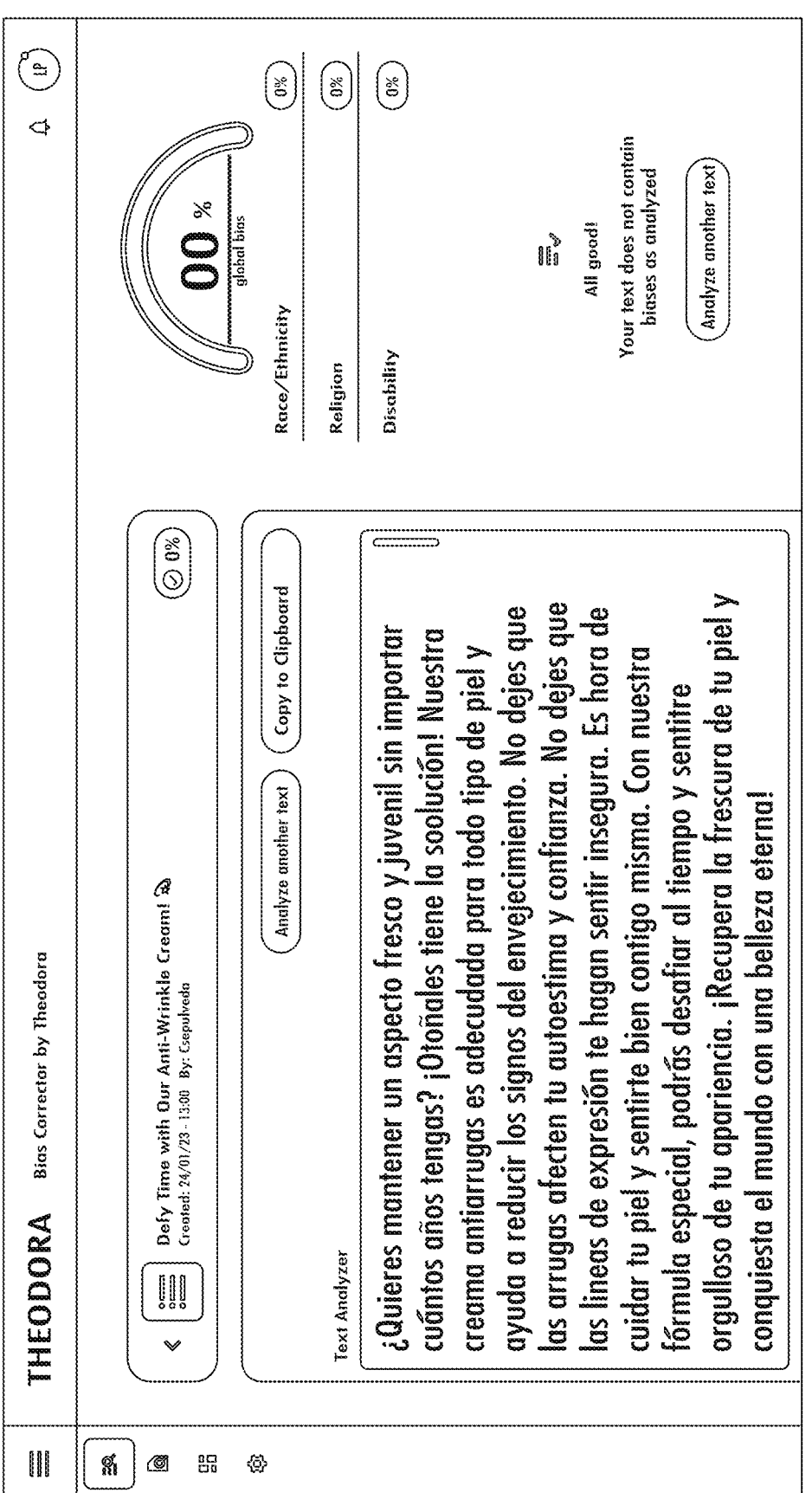

In some embodiments, the candidate bias mitigation insight operation may also include actually replacing the identified biasing terms with the one or more candidate bias mitigation insights. In some embodiments, such replacement may be performed automatically without requirement for user interaction, and in some embodiments, such replacement operation may be performed after receipt of a confirmation from a user to continue to replace the identified biasing term(s) with the one or more candidate bias mitigation insights. For example, as depicted in FIG. 7D, an example user interface depicting the analyzed text of FIG. 7B as updated and/or otherwise incorporating the candidate bias mitigation insights into the text. The example user interface of FIG. 7D further depicts a "global bias" of 0% once all identified bias terms or phrases are updated and/or corrected by the bias resolution computing entity 102 and/or in response to user input received by the bias resolution computing entity 102.

An example output of the machine learning bias mitigation model in step/operation 608 is set forth below:

```
{"recommendation": [
    "Las personas trabajadoras de clase media son las que
        sostienen al país sobre sus hombros"
]}
```

In some embodiments, at least one of the one or more machine learning models is a pre-trained large language foundation model fine-tuned using a tokenized DLB comprising a plurality of tokens that correspond to one or more bias classification labels. For example, in some embodiments, the machine learning model of step/operation 604 (e.g., used to identify one or more biasing terms) is a pre-trained large language foundation model (e.g., BERT) that is fine-tuned using a tokenized DLB, such as set forth in FIG. 4 and process 400. That is, the machine learning model may be a large language model based on foundation models (e.g., trained with large volumes of data that come from humans who have inherent biases such that the foundation models learn to replicate such biases during their training stages) that is fine-tuned using a tokenized DLB comprising a plurality of tokens that correspond to one or more bias classification labels to adapt the machine learning model for the more specific task of bias detection of the present disclosure.

According to some examples, the process 600 includes, at step/operation 610, outputting, through an interactive user interface component, a presentation of one or more candidate bias mitigation insights to a user. For example, in some embodiments, the bias resolution computing entity 102 (e.g., bias resolution system) may initiate, through an interactive user interface component, a presentation of one or more candidate bias mitigation insights relative to the original textual data of the analyzed document. The bias resolution computing entity 102 (e.g., bias resolution system) may identify, highlight, overlay, or otherwise emphasize the identified biasing terms present in the originally analyzed document, as well as provide one or more candidate bias mitigation insights as suggested specific mitigations to eliminate or otherwise mitigate the biases, thereby providing a detailed analysis and a practical solution. The user interface component may be leveraged by external computing entities 112A-112C in communication with the bias resolution system, enabling a user to analyze, identify, record, and mitigate different classes of bias, in real time, in a variety of different types of documents.

In some embodiments, the presentation of one or more candidate bias mitigation insights via the interactive user interface component may further enable or allow for feedback or further instructions from the user with respect to the candidate bias mitigation insights. For example, the bias resolution computing entity 102 (e.g., bias resolution system) may receive, through the interactive user interface component, user input indicative of a selection of at least one of the one or more candidate bias mitigation insights. Additionally or alternatively, in some embodiments, user interface components may be configured to receive one or more prompts from a user. For example, the user interface component may include a window/sub-window configured to accept user input for such instructive prompts. That is, the bias resolution computing entity 102 (bias resolution system) may be configured to receive user input, via the user interface component, asking the bias resolution computing entity 102 (via the bias mitigation model) to re-write the identified bias term phrasing (e.g., if the user does not feel comfortable rewriting the phrasing themselves). That is, in some embodiments, the bias mitigation model may be configured to receive one or more prompts from a user to provide different types of output. In addition, or alternatively, the user input may identify a modification to an existing candidate bias mitigation insight (e.g., providing a prompt indicating that the existing candidate bias mitigation insight is not acceptable). As described herein, it is contemplated by the present disclosure that the bias mitigation model can use such prompts and information (e.g., the proposed change and the user response) as more training data to indicate what is and is not an acceptable change, therefore, continuing to provide a training feedback loop and an improved bias mitigation model.

The bias resolution computing entity 102 may be further configured to generate an updated version of the document, the updated version of the document comprising the selected candidate bias mitigation insight in place of the corresponding one or more biasing terms with the changes shown or otherwise reflected in different formats (e.g., strike-throughs (for removed text), underlines (for added text), different color text, and/or other differences in formatting to identify the changes made in the modified text) or as separate comments such that the user can easily see what has been changed. That is, in some embodiments, such replacement operation may be performed after receipt of a confirmation from a user to continue to replace the identified biasing term(s) with the one or more candidate bias mitigation insights. Additionally or alternatively, in some embodiments, such replacement may be performed automatically without requirement for user interaction.

As described herein, various operations of the bias resolution system may leverage and power interactive user interfaces and user interface components for viewing, manipulating, and processing various biasing terms and candidate bias mitigation insights for a document. For example, the interactive user interface component for presenting at least the candidate bias mitigation insight(s) may be leveraged to receive and generate new training input data objects, which may then be used to refine machine learning models configured to generate candidate bias mitigation insight predictions. Such predictions, including the identified biasing terms, may be presented to a user through one or more interactive user interface components, which may be interacted with by the user to continuously refine, update, and fine-tune the bias resolution modeling techniques described herein. For example, by leveraging a learning algorithm and user feedback from the selected candidate bias mitigation insight, the learning algorithm may be further fine-tuned after the initial training. As user feedback is collected with respect to various bias decisions of the bias resolution system by providing improved user interfaces for users to accept and/or override the bias mitigation insights. This, in turn, enables the bias resolution system to continue to learn from the applied confirmations and/or changes associated with the user feedback. Such a feedback scheme for automatic, continuous, training of the machine learning pipeline provides for improved predictions.

As described herein, various operations of the bias resolution system may leverage and power a new interactive user interface 800 for dynamically surfacing, exposing, or monitoring identified biasing terms, candidate bias mitigation insights, bias metrics, and other relevant data for a plurality of bias categories to a user. For example, as depicted in FIG. 8, a new interactive user interface 800 operates as a bias dashboard at an organization level, leveraging the outputs of a machine learning model pipeline (e.g., identified biasing terms, candidate bias mitigation insights, bias metrics, and other relevant data) to present easily interpretable data for consumption by the organizational user. For example, identified biasing terms, bias classifications, and candidate bias mitigation insights may be derived from predictions for the analyzed text and may present previously undetectable metrics, statistics, and insights to the user.

As depicted in FIG. 8, the interactive user interface 800 may include a list interface 801 that is rendered to reflect one or more recently detected biases, including the identified bias classification and the corresponding text. For example, the list of recently detected biases may be modified through user input (e.g., a click input, a double click input, etc.) to view additional information regarding a selected bias of the list, to select a different page of the list, and/or the like.

As depicted in FIG. 8, the interactive user interface 800 may include a plurality of metrics components 802 that are rendered to reflect quantities and trends of various bias classifications. For example, a first metric component indicates that 52 gender biases have been identified, which reflects 24 more gender biases detected since last visit. In another example, a second metric component indicates that 10 age biases have been identified, which reflects a 50% decrease since last week. In still another example, a third metric component indicates 2 disability biases have been detected, which reflects 1 less disability biases detected since last visit. In still a further example, a fourth metric component indicates 15 race/ethnicity/nationality biases have been detected, which reflects a 20% increase since last month.

As depicted in FIG. 8, the interactive user interface 800 may enable graphical depictions 803 of such metrics, statistics, and insights to visualize changes over time and across a variety of different bias classifications. The improved user interfaces and user interface components enable organizations to take decisions to reduce reputational risk (e.g., diversity and inclusion), for example, which is unattainable by traditional computing systems.

V. CONCLUSION

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A bias resolution system comprising memory storing instructions and one or more processors communicatively coupled to the memory, the one or more processors executing the instructions to:

train a model as a pre-trained large language foundation model by tuning the model using a tokenized dataset of labeled biases (DLB) comprising tokens corresponding to bias classification labels;

perform, using the model, a tokenization operation upon textual data of documents to create tokenized textual data;

identify, using the model to process the tokenized textual data, biasing terms within the textual data of the documents;

generate, using the model, candidate bias mitigation insights corresponding to the biasing terms, wherein the model generates the candidate bias mitigation insights to include replacement text for the biasing terms;

generate, using the model, candidate bias mitigation insights corresponding to the biasing terms, wherein the model generates the candidate bias mitigation insights to include replacement text for the biasing terms, wherein the generating the candidate bias mitigation insights includes inputting the biasing terms and the corresponding bias classification labels and bias position identifications into a bias mitigation model to generate the candidate bias mitigation insights, and wherein the bias mitigation model is a large language model (LLM) trained with proper grammar and meaning of words for drafting grammatically correct phrasing matching a meaning of identified biased text;

generate a bias dashboard as an interactive user interface populated with the biasing terms, the candidate bias mitigate insights, and bias metric components reflecting quantities and trends of bias classifications changing over time, wherein a first bias metric component displays a first count of a first type of bias classification identified and a first percentage change over time in the first count, and wherein a second bias metric component displays a second count of a second type of bias classification identified and a second percentage change over time in the second count, wherein the interactive user interface includes a list interface rendered to reflect recently detected biases and the bias classifications with corresponding text;

dynamically surface, through the bias dashboard, a graphical depiction of the bias metric components to visualize the bias classifications changing over time; and automatically execute replacement operations to replace the biasing terms within the textual data of the documents with the replacement text of the candidate bias mitigation insight to create an updated document.

2. The bias resolution system of claim 1, wherein the one or more processors execute the instructions to:

generate and surface through the bias dashboard a summary of recent bias analyses performed, wherein the summary is generated to include color-coded visual emphasis elements corresponding to amounts of bias detected in the documents.

3. The bias resolution system of claim 1, wherein identifying the biasing terms comprises:

inputting the tokenized textual data into a machine learning bias detector model;

detecting, using the machine learning bias detector model, the biasing terms in the tokenized textual data; and generating a bias classification label and a bias position identification for each of the biasing terms.

4. The bias resolution system of claim 1, wherein the candidate bias mitigation insights comprise a proposed replacement text string.

5. The bias resolution system of claim 1, wherein the candidate bias mitigation insights comprise a proposed replacement text string or textual instructions to rephrase the corresponding biasing terms.

6. The bias resolution system of claim 1, wherein a portion of each bias classification label identifies a corresponding token as a beginning token of a bias classification or as an identified token of the bias classification.

7. The bias resolution system of claim 1, wherein a tokenized DLB is generated from a DLB comprising a plurality of text samples, each text sample including a position of at least one identified biased text, bias classification information of the at least one identified biased text, and at least one bias mitigation text corresponding to the at least one identified biased text.

8. The bias resolution system of claim 1, wherein the one or more processors execute the instructions to:

apply a first text format to the replacement text within the updated document to visually distinguish the replacement text from original text retained within the updated document and a second text format to the biasing term replaced by the replacement text; and display the updated document through the bias dashboard.

9. The bias resolution system of claim 7, wherein the one or more processors execute the instructions to:

receive the DLB;

perform one or more data processing techniques to the DLB to form the tokenized DLB, wherein the one or more data processing techniques comprises at least one of a transformation process, an extraction process, or a tokenization operation; and train the model with the tokenized DLB.

10. The bias resolution system of claim 7, wherein the DLB is generated using a bias criterion defining a plurality of bias classifications, and for each bias classification, a corresponding description for identifying a biased text as encompassed by the respective bias classification.

11. A computer-implemented method for identifying and mitigating bias in written communications, the computer-implemented method comprising:

training a model as a pre-trained large language foundation model by tuning the model using a tokenized dataset of labeled biases (DLB) comprising tokens corresponding to bias classification labels;

performing, using the model, a tokenization operation upon textual data of documents to create tokenized textual data;

identifying, using the model to process the tokenized textual data, biasing terms within the textual data of the documents;

generating, using the model, candidate bias mitigation insights corresponding to the biasing terms, wherein the model generates the candidate bias mitigation insights to include replacement text for the biasing terms, wherein the generating the candidate bias mitigation insights includes inputting the biasing terms and the corresponding bias classification labels and bias position identifications into a bias mitigation model to generate the candidate bias mitigation insights, and wherein the bias mitigation model is a large language model (LLM) trained with proper grammar and meaning of words for drafting grammatically correct phrasing matching a meaning of identified biased text;

generating a bias dashboard as an interactive user interface populated with the biasing terms, the candidate bias mitigate insights, and bias metric components reflecting quantities and trends of bias classifications changing over time, wherein a first bias metric component displays a first count of a first type of bias classification identified and a first percentage change over time in the first count, and wherein a second bias metric component displays a second count of a second type of bias classification identified and a second percentage change over time in the second count, wherein the interactive user interface includes a list interface rendered to reflect recently detected biases and the bias classifications with corresponding text;

dynamically surfacing, through the bias dashboard, a graphical depiction of the bias metric components to visualize the bias classifications changing over time; and automatically executing replacement operations to replace the biasing terms within the textual data of the documents with the replacement text of the candidate bias mitigation insight to create an updated document.

12. The computer-implemented method of claim 11, further comprising:

generating and surfacing through the bias dashboard a summary of recent bias analyses performed, wherein the summary is generated to include color-coded visual emphasis elements corresponding to amounts of bias detected in the documents.

13. The computer-implemented method of claim 11, wherein identifying the biasing terms comprises:

inputting the tokenized textual data into a machine learning bias detector model;

detecting, using the machine learning bias detector model, the biasing terms in the tokenized textual data; and generating a bias classification label and a bias position identification for each of the one or more biasing terms.

14. The computer-implemented method of claim 11, wherein the candidate bias mitigation insights comprise a proposed replacement text string.

15. The computer-implemented method of claim 11, wherein the candidate bias mitigation insights comprise a proposed replacement text string or textual instructions to rephrase the corresponding biasing terms.

16. The computer-implemented method of claim 11, wherein a portion of each bias classification label identifies a corresponding token as a beginning token of a bias classification or as an identified token of the bias classification.

17. A non-transitory computer-readable storage medium for identifying and mitigating bias in written communications, the non-transitory computer-readable storage medium including instructions that when executed by a computer, cause the computer to:

train a model as a pre-trained large language foundation model by tuning the model using a tokenized dataset of labeled biases (DLB) comprising tokens corresponding to bias classification labels;

perform, using the model, a tokenization operation upon textual data of documents to create tokenized textual data;

identify, using the model to process the tokenized textual data, biasing terms within the textual data of the documents;

generate, using the model, candidate bias mitigation insights corresponding to the biasing terms, wherein the model generates the candidate bias mitigation insights to include replacement text for the biasing terms, wherein the generating the candidate bias mitigation insights includes inputting the biasing terms and the corresponding bias classification labels and bias position identifications into a bias mitigation model to generate the candidate bias mitigation insights, and wherein the bias mitigation model is a large language model (LLM) trained with proper grammar and meaning of words for drafting grammatically correct phrasing matching a meaning of identified biased text;

generate a bias dashboard as an interactive user interface populated with the biasing terms, the candidate bias mitigate insights, and bias metric components reflecting quantities and trends of bias classifications changing over time, wherein a first bias metric component displays a first count of a first type of bias classification identified and a first percentage change over time in the first count, and wherein a second bias metric component displays a second count of a second type of bias classification identified and a second percentage change over time in the second count, wherein the interactive user interface includes a list interface rendered to reflect recently detected biases and the bias classifications with corresponding text;

dynamically surface, through the bias dashboard, a graphical depiction of the bias metric components to visualize the bias classifications changing over time; and automatically execute replacement operations to replace the biasing terms within the textual data of the documents with the replacement text of the candidate bias mitigation insight to create an updated document.

18. The non-transitory computer-readable storage medium of claim 17, wherein identifying the biasing terms comprises:

inputting the tokenized textual data into a machine learning bias detector model;

detecting, using the machine learning bias detector model, the biasing terms in the tokenized textual data; and generating a bias classification label and a bias position identification for each of the biasing terms.

19. The non-transitory computer-readable storage medium of claim 17, wherein generating the candidate bias mitigation insights comprises:

inputting the biasing terms and the corresponding bias classification labels and bias position identifications to a machine learning bias mitigation model to generate the candidate bias mitigation insights.

20. The non-transitory computer-readable storage medium of claim 17, wherein a portion of each bias classification label identifies a corresponding token as a beginning token of a bias classification or as an identified token of the bias classification.

* * * * *